US012775330B2

(12) United States Patent
Huang et al.

(10) Patent No.: US 12,775,330 B2
(45) Date of Patent: Oct. 27, 2026

(54) METHOD AND APPARATUS FOR DISPLAYING IMAGES ON HEAD-MOUNTED DISPLAY DEVICE, DEVICE AND MEDIUM

(71) Applicant: BEIJING UNICORN TECHNOLOGY CO., LTD., Beijing (CN)

(72) Inventors: Can Huang, Beijing (CN); Kejian Wu, Beijing (CN)

(73) Assignee: BEIJING UNICORN TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/144,502

(22) PCT Filed: Dec. 30, 2023

(86) PCT No.: PCT/CN2023/143687

§ 371 (c)(1),
(2) Date: Jun. 29, 2025

(87) PCT Pub. No.: WO2024/141098

PCT Pub. Date: Jul. 4, 2024

(65) Prior Publication Data

US 2026/0211484 A1 Jul. 23, 2026

(30) Foreign Application Priority Data

Dec. 30, 2022 (CN) ......................... 202211732721.2
Feb. 14, 2023 (CN) ......................... 202310158847.1

(51) Int. Cl.
*G06F 3/01* (2006.01)
*G02B 27/01* (2006.01)

(52) U.S. Cl.
CPC ............ *G06F 3/011* (2013.01); *G02B 27/017* (2013.01); *G06F 2203/012* (2013.01); *G06F 2203/014* (2013.01)

(58) Field of Classification Search
CPC .............................. G06F 3/011; G02B 27/017
(Continued)

(56) References Cited

U.S. PATENT DOCUMENTS 9,217,867 B2 * 12/2015 Nakada ................ G09G 3/3406
2016/0238841 A1 * 8/2016 LaValle .............. G02B 27/0093
2021/0089116 A1 * 3/2021 Erivantcev ................ G06T 7/20

FOREIGN PATENT DOCUMENTS

CN 107389088 A 11/2017
CN 112066984 A 12/2020
(Continued)

OTHER PUBLICATIONS

The international search report of PCT Application PCT/CN2023/143687, mailed Mar. 7, 2024, 4 pages with English translation.

*Primary Examiner* — Kwin Xie
(74) *Attorney, Agent, or Firm* — K&L Gates LLP

(57) ABSTRACT

A method includes: acquiring predicted state variables and observation data at a current-correction time; determining the corrected state variables at the current correction time based on the predicted state variables and the observation data at the current correction time, wherein the corrected state variables include: a first corrected orientation of the head-mounted display device in the world coordinate system, a second corrected orientation of a target device in the world coordinate system, a first corrected bias parameter of a first magnetometer, and a second corrected bias parameter of a second magnetometer; determining a relative orientation between the head-mounted display device and the target device based on the first corrected orientation and the second corrected orientation; and rendering to-be-displayed images
(Continued)

of the head-mounted display device based on the relative orientation, so as to display the to-be-displayed images through the head-mounted display device.

20 Claims, 4 Drawing Sheets

(58) Field of Classification Search
USPC .............................................. 345/8, 156–169
See application file for complete search history.

(56) References Cited

FOREIGN PATENT DOCUMENTS

| | | | | |
|---|---|---|---|---|
| CN | 114979615 | A | 8/2022 | |
| WO | 2004072579 | A1 | 8/2004 | |
| WO | WO-2019204638 | A1 * | 10/2019 | ............. G06F 3/012 |

* cited by examiner

METHOD AND APPARATUS FOR DISPLAYING IMAGES ON HEAD-MOUNTED DISPLAY DEVICE, DEVICE AND MEDIUM

CROSS-REFERENCE TO RELATED APPLICATIONS

The present application is a national phase entry under 35 USC § 371 of International Application PCT/CN2023/143687, filed on Dec. 30, 2023, which claims the benefit of and the priority of Chinese patent applications filed with the Chinese Patent Office on Dec. 30, 2022, and Feb. 14, 2023, with application numbers of CN 202211732721.2 and CN 202310158847.1 and entitled "Method and Apparatus for Displaying Images on Head-Mounted Display Device, Device and Medium", the contents of which are incorporated herein by reference in their entireties.

TECHNICAL FIELD

The present disclosure relates to the technical field of head-mounted display devices, in particular to a method and apparatus for displaying images on a head-mounted display device, a device and a medium.

BACKGROUND

Head-mounted display devices that adopt technologies such as augmented reality (AR) and virtual reality (VR) are being applied more and more widely. The head-mounted display devices can be used for content display, such as displaying movie images, game images, web pages, and so on.

SUMMARY

Embodiments of the present disclosure provide a method and apparatus for displaying images on a head-mounted display device, a device and a medium.

According to one aspect of embodiments of the present disclosure, a method for displaying images on a head-mounted display device is provided, and the method includes: acquiring predicted state variables and observation data at a current correction time, wherein the predicted state variables include: a first predicted orientation of the head-mounted display device in a world coordinate system, a second predicted orientation of a target device in the world coordinate system, a first predicted bias parameter of a first magnetometer mounted on the head-mounted display device, and a second predicted bias parameter of a second magnetometer mounted on the target device; the target device is a device associated with image display of the head-mounted display device; and the observation data includes at least one of the following: data collected by the first magnetometer and the second magnetometer, and data collected by at least one of a first accelerometer mounted on the head-mounted display device and a second accelerometer mounted on the target device; determining corrected state variables at the current correction time based on the predicted state variables and the observation data at the current correction time, wherein the corrected state variables include: a first corrected orientation of the head-mounted display device in the world coordinate system, a second corrected orientation of the target device in the world coordinate system, a first corrected bias parameter of the first magnetometer, and a second corrected bias parameter of the second magnetometer; the first predicted bias parameter at the current correction time is equal to the corrected bias parameter of the first magnetometer at a previous correction time; the second predicted bias parameter at the current correction time is equal to the corrected bias parameter of the second magnetometer at the previous correction time; the first predicted orientation at the current correction time is obtained by adding a first angular variation of the head-mounted display device at the current correction time to the corrected orientation of the head-mounted display device at the previous correction time; the second predicted orientation at the current correction time is obtained by adding a second angular variation of the target device at the current correction time to a corrected orientation of the target device at the previous correction time; the first angular variation of the head-mounted display device at the current correction time includes: an integral value of angular velocity data collected by a first gyroscope mounted on the head-mounted display device from the previous correction time to the current correction time; and the second angular variation of the target device at the current correction time includes: an integral value of angular velocity data collected by a second gyroscope mounted on the target device from the previous correction time to the current correction time; determining a relative orientation between the head-mounted display device and the target device based on the first corrected orientation and the second corrected orientation; and rendering to-be-displayed images of the head-mounted display device based on the relative orientation, so as to display the to-be-displayed images through the head-mounted display device.

According to another aspect of the embodiments of the present disclosure, an apparatus for displaying images on a head-mounted display device is provided, and the apparatus includes: an acquisition module configured to acquire predicted state variables and observation data at a current correction time, wherein the predicted state variables include: a first predicted orientation of a head-mounted display device in a world coordinate system, a second predicted orientation of a target device in the world coordinate system, a first predicted bias parameter of a first magnetometer mounted on the head-mounted display device, and a second predicted bias parameter of a second magnetometer mounted on the target device; the target device is a device associated with image display of the head-mounted display device; the observation data includes at least one of the following: data collected by the first magnetometer and the second magnetometer, and data collected by at least one of the first accelerometer mounted on the head-mounted display device and the second accelerometer mounted on the target device; a determination module configured to determine corrected state variables at the current correction time based on the predicted state variables and the observation data at the current correction time, wherein the corrected state variables include: a first corrected orientation of the head-mounted display device in the world coordinate system, a second corrected orientation of the target device in the world coordinate system, a first corrected bias parameter of the first magnetometer, and a second corrected bias parameter of the second magnetometer; the first predicted bias parameter at the current correction time is equal to the corrected bias parameter of the first magnetometer at a previous correction time; the second predicted bias parameter at the current correction time is equal to the corrected bias parameter of the second magnetometer at the previous correction time; the first predicted orientation at the current correction time is obtained by adding a first angular variation of the head-mounted display device at the current correction time to the corrected orientation of the head-mounted display device at the previous correction time; the second predicted orientation at the current correction time is obtained by adding a second angular variation of the target device at the current correction time to a corrected orientation of the target device at the previous correction time; the first angular variation of the head-mounted display device at the current correction time includes: an integral value of angular velocity data collected by a first gyroscope mounted on the head-mounted display device from the previous correction time to the current correction time; and the second angular variation of the target device at the current correction time includes: an integral value of angular velocity data collected by a second gyroscope mounted on the target device from the previous correction time to the current correction time; and the determination module is further configured to determine a relative orientation between the head-mounted display device and the target device based on the first corrected orientation and the second corrected orientation; and a rendering module configured to render to-be-displayed images of the head-mounted display device based on the relative orientation, so as to display the to-be-displayed images through the head-mounted display device.

According to another aspect of the present disclosure, a computer-readable storage medium is provided, and the storage medium is configured to store a computer program, wherein the computer program is configured to execute the above method for displaying images on a head-mounted display device.

According to another aspect of the present disclosure, an electronic device is provided, and the electronic device includes: a memory configured to store a computer program; and a processor configured to execute the computer program stored in the memory, wherein when being executed, the computer program implements the above method for displaying images on a head-mounted display device.

According to still another aspect of the present disclosure, a computer program product is provided, and the computer program product includes a computer program instruction, and when being executed by a processor, the computer program instruction implements the method for displaying images on a head-mounted display device.

The technical solution of the present disclosure is further described in detail below in conjunction with the accompanying drawings and embodiments.

BRIEF DESCRIPTION OF THE DRAWINGS

The above and other objects, features and advantages of the present disclosure will become more apparent from more detailed description of embodiments of the present disclosure in conjunction with the accompanying drawings. The accompanying drawings are used to provide further understanding of embodiments of the present disclosure, and form part of the specification, and are used, together with embodiments of the present disclosure, for explaining the present disclosure, but do not limit the present disclosure. In the accompanying drawings, the same reference numerals usually represent the same components or steps.

DETAILED DESCRIPTION

Figure 1:
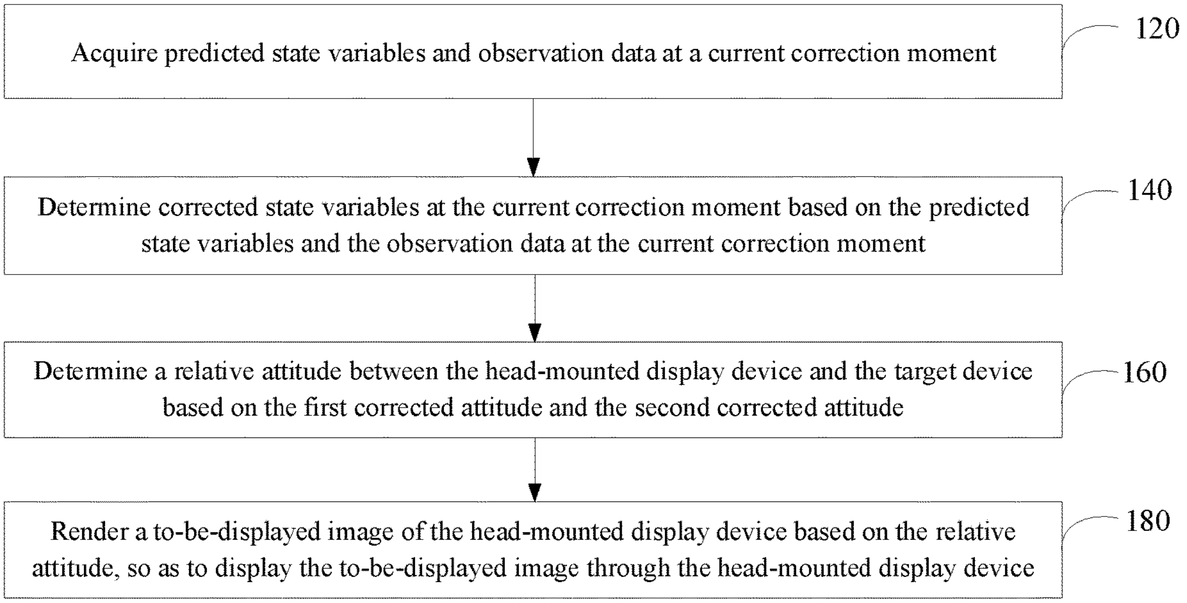
FIG. 1 is a flow diagram of a method for displaying images on a head-mounted display device provided in an exemplary embodiment of the present disclosure.

Exemplary embodiments according to the present disclosure will be described below in detail with reference to the accompanying drawings. Obviously, the described embodiments are only part of, instead of all of the embodiments of the present disclosure. It should be understood that the present disclosure is not limited by the exemplary embodiments described herein.

It is to be noted that unless specifically stated otherwise, the relative arrangement of components and steps, numerical expressions and numerical values set forth in these embodiments do not limit the scope of the present disclosure.

It may be understood by those skilled in the art that the terms "first", "second" and the like in the embodiments of the present disclosure are only used to distinguish between different steps, devices or modules, etc., and do not represent any particular technical meaning or indicate an inevitable logical order thereof.

It should also be understood that in embodiments of the present disclosure, "a plurality of" may refer to two or more, and "at least one" may refer to one, two, or more.

It should also be understood that the number of any component, data, or structure mentioned in embodiments of the present disclosure may generally be understood to be one or more, unless explicitly defined or indicated otherwise by the context.

Additionally, the term "and/or" in the present disclosure merely represents an association relationship describing associated objects, indicating there may be three relationships. For example, A and/or B may indicate three situations: A exists alone; both A and B exist; and B exists alone. Additionally, the character "/" in the present disclosure generally indicates that the associated objects prior to and following it are in an "or" relationship.

It should also be understood that description of the various embodiments in the present disclosure emphasizes differences between the various embodiments. For their identical aspects or similarities, reference may be made to each other, and for the sake of brevity, they will not be described repeatedly.

Furthermore, it should be appreciated that, for ease of description, the sizes of various parts shown in the drawings are not drawn according to actual proportional relationships.

The following description of at least one exemplary embodiment is actually only illustrative, and in no way serves as any limitation on the present disclosure and its application or use.

Technologies, methods, and devices known to those of ordinary skill in the related art may not be discussed in detail, but where appropriate, the technologies, methods, and devices should be regarded as part of the specification.

It should be noted that similar reference numerals and letters denote similar items in the following drawings, so once a certain item is defined in one drawing, it does not need to be further discussed in subsequent drawings.

Embodiments of the present disclosure may be applied to electronic devices such as terminal devices, computer systems, servers, etc., which may operate with numerous other general-purpose or specialized computing system environments or configurations. Examples of well-known terminal devices, computing systems, environments, and/or configurations suitable for use with electronic devices such as terminal devices, computer systems, servers, etc. include, but are not limited to: personal computer systems, server computer systems, thin clients, thick clients, handheld or laptop devices, microprocessor-based systems, set-top boxes, programmable consumer electronics, network personal computers, minicomputer systems, mainframe computer systems, and distributed cloud computing technology environments that include any system described above, and so on.

Electronic devices such as terminal devices, computer systems, servers, etc. may be described in the general context of computer system executable instructions (such as program modules) executed by a computer system. Typically, program modules may include routines, procedures, target programs, components, logic, data structures and the like that perform specific tasks or implement specific abstract data types. The computer systems/servers may be implemented in a distributed cloud computing environment, in which tasks are performed by remote processing devices linked through a communication network. In the distributed cloud computing environment, the program modules may be located on a local or remote computing system storage medium that includes a storage device.

Exemplary Overview

The head-mounted display device can also be called a head-mounted display (HMD) or a head display. The head-mounted display device can be configured to achieve extended reality (XR) effects, such as augmented reality (AR) effects, virtual reality (VR) effects, mixed reality (MR) effects, etc. Since the head-mounted display device can create a unique sense of immersion, when the head-mounted display device is used, a user can subjectively feel that he is in a space that is isolated from reality, and this space can serve as a virtual space of the head-mounted display device. Optionally, the head-mounted display device may be AR glasses, VR glasses, MR glasses, etc.

In some usage scenarios, it is necessary to calculate and apply the relative orientation between the head-mounted display device and the predetermined object, for example, the display images in a virtual space of the head-mounted display device can be controlled by referring to the relative orientation between the head-mounted display device and the predetermined object.

In an optional embodiment of the present disclosure, the predetermined object may be an object that is movable relative to the world coordinate system (which may also be referred to as the global coordinate system), including but not limited to vehicles, ships, airplanes, and trains.

In another optional embodiment of the present disclosure, the predetermined object can be an object that is immovable relative to the world coordinate system, including but not limited to a wall or the ground.

In order to ensure application effects of the relative orientation in various usage scenarios, certain measures need to be taken to improve accuracy and reliability of the relative orientation.

In some optional embodiments of the present disclosure, a method for determining a relative orientation is provided, including the following steps.

Step 1: acquiring predicted state variables and observation data at a current correction time.

In an optional embodiment of the present disclosure, the predicted state variables include: a first predicted orientation of a first device in a world coordinate system, a second predicted orientation of a second device in the world coordinate system, a first predicted bias parameter of a first magnetometer mounted on the first device, and a second predicted bias parameter of a second magnetometer mounted on the second device.

The observation data may include at least one of the following: data collected by the first magnetometer and the second magnetometer, and data collected by at least one of the first accelerometer mounted on the first device and the second accelerometer mounted on the second device.

Both the first device and the second device can be provided with a magnetometer and a gyroscope. At least one of the first device and the second device can also be provided with an accelerometer.

In an optional embodiment of the present disclosure, the first device and the second device can be two arbitrary devices.

In an optional embodiment of the present disclosure, the first device may be a terminal device. The terminal device may include a head-mounted display device, a movable phone, a handle, an adapter, a finger ring, and an entertainment terminal on a movable platform (such as a vehicle infotainment system), wherein the movable phone, the handle, the adapter, and the finger ring can be collectively referred to as a controller.

In an optional embodiment of the present disclosure, the second device may be a device configured with an inertial measurement unit (IMU). The second device can be integrated into various movable platforms, and the movable platforms may include vehicles, ships, airplanes, trains, elevators, and the like. The second device can also be a portable device, and the portable device is detachably fixed to a predetermined object by means of structures such as hooks, clips, suction cups, magnets, etc.

Of course, the first device and the second device can be interchanged.

Step 2: determining corrected state variables at the current correction time based on the predicted state variables and the observation data at the current correction time.

In an optional embodiment of the present disclosure, the corrected state variables include: a first corrected orientation of the first device in the world coordinate system, a second corrected orientation of the second device in the world coordinate system, a first corrected bias parameter of the first magnetometer, and a second corrected bias parameter of the second magnetometer.

The first predicted bias parameter at the current correction time is equal to the corrected bias parameter of the first magnetometer at a previous correction time, and the second predicted bias parameter at the current correction time is equal to the corrected bias parameter of the second magnetometer at the previous correction time. The first predicted orientation at the current correction time is obtained by adding a first angular variation of the first device at the current correction time to the corrected orientation of the first device at the previous correction time, and the second predicted orientation at the current correction time is obtained by adding a second angular variation of the second device at the current correction time to the corrected orientation of the second device at the previous correction time. The first angular variation of the first device at the current correction time includes: an integral value of angular velocity data collected by a first gyroscope mounted on the first device from the previous correction time to the current correction time, and the second angular variation of the second device at the current correction time includes: an integral value of angular velocity data collected by a second gyroscope mounted on the second device from the previous correction time to the current correction time.

Step 3: determining a relative orientation between a first device and a second device based on the first corrected orientation and the second corrected orientation.

Therefore, the relative orientation between the first device and the second device can be determined. In some optional embodiments of the present disclosure, a method for determining a relative orientation is provided, including the following steps.

Step 1: acquiring predicted state variables and observation data at the current correction time.

In an optional embodiment of the present disclosure, the predicted state variables include: a relative predicted orientation of a first device and a second device in a world coordinate system, a first predicted bias parameter of a first magnetometer mounted on the first device, and a second predicted bias parameter of a second magnetometer mounted on the second device.

The observation data may include at least one of the following: data collected by the first magnetometer and the second magnetometer, and data collected by at least one of the first accelerometer mounted on the first device and the second accelerometer mounted on the second device.

Step 2: determining corrected state variables at the current correction time based on the predicted state variables and the observation data at the current correction time.

The corrected state variables include: the relative corrected orientation of the first device and the second device in the world coordinate system, the first corrected bias parameter of the first magnetometer, and the second corrected bias parameter of the second magnetometer.

The first predicted bias parameter at the current correction time is equal to the corrected bias parameter of the first magnetometer at a previous correction time, and the second predicted bias parameter at the current correction time is equal to the corrected bias parameter of the second magnetometer at the previous correction time. The relative predicted orientation at the current correction time is determined by the corrected orientation of the first device at the previous correction time, the first angular variation of the first device at the current correction time, the corrected orientation of the second device at the previous correction time, and the second angular variation of the second device at the current correction time. The first angular variation of the first device at the current correction time includes an integral value of the angular velocity data collected by the first gyroscope arranged on the first device from the previous correction time to the current correction time. The second angular variation of the second device at the current correction time includes an integral value of the angular velocity data collected by the second gyroscope arranged on the second device from the previous correction time to the current correction time.

Step 3: determining a relative orientation between the first device and the second device based on the first corrected orientation and the second corrected orientation.

Therefore, the relative orientation between the first device and the second device can be determined.

To facilitate the understanding of the solution in this embodiment, the following enumerates some application scenarios of this embodiment.

1. The first device is a head-mounted display device, and the second device can be any other device. The display image displayed by the head-mounted display device can be rendered, adjusted and controlled according to the relative orientation between the first device and the second device.

2. The first device is a controller, and the second device is a head-mounted display device. The display image displayed by the head-mounted display device is controlled according to the relative orientation between the first device and the second device. The control may include clicking, selecting, dragging, sliding and so on.

3. The first device includes a head-mounted display device and a controller; and the second device is fixed to a movable platform. The second device is fixed to the movable platform in the following manner: the second device is integrated into the movable platform, or the second device is detachably fixed to the movable platform. The relative orientation between the head-mounted display device and the second device is used for rendering, adjusting and controlling the display image displayed by the head-mounted display device. The relative orientation between the controller and the second device is used for controlling the display image displayed by the head-mounted display device. The control may include clicking, selecting, dragging, sliding and so on.

Of course, the solution for determining the relative orientation in the present disclosure is not limited to the above three application scenarios, and the solution of the present disclosure is applicable to any scenario where the relative orientation between two devices needs to be calculated.

In some usage scenarios, it is necessary to calculate and utilize the relative orientation between the head-mounted display device and the predetermined object. For example, the relative orientation between the head-mounted display device and the predetermined object can be referred to for rendering, adjusting and controlling the virtual image displayed by the head-mounted display device. Herein, the head-mounted display device can be the first device, and the second device is fixed on a predetermined object.

By referring to the relative orientation between the head-mounted display device and the predetermined object, a virtual image displayed by the head-mounted display device can be rendered, adjusted and controlled. Achievable effects include but are not limited to: under a premise of taking a coordinate system fixedly connected to a predetermined object as a reference, if the relative orientation between the head-mounted display device and the predetermined object remains consistent, the orientation of the display image basically does not change in the coordinate system of the head-mounted display device. The display effect of the image displayed by the head-mounted display device is similar to the effect of directly projecting an image through the head-mounted display device. If the head-mounted display device and the predetermined object do not maintain the same orientation, the orientation of the display image changes correspondingly in the coordinate system of the head-mounted display device. The display effect of the image displayed by the head-mounted display device is similar to the 3dof (three degrees of freedom) display effect with the predetermined object as a reference.

In some usage scenarios, a user wears a head-mounted display device and views virtual images displayed by the head-mounted display device. Sometimes, interaction with the virtual images is performed by means of a controller. The controller can be communicatively connected to the head-mounted display device, and the relative orientation between the controller and the head-mounted display device can be used to control the virtual images displayed by the head-mounted display device. The control herein may include clicking, selecting, dragging, and so on. Herein, the head-mounted display device can be the first device, and the controller can be the second device.

While in some usage scenarios, when a controller is required, the relative orientation between the controller and the predetermined object also needs to be calculated and used, so as to control the virtual images displayed by the head-mounted display device by referring to the relative orientation between the control device and the predetermined object. Herein, the controller can be the first device, and the second device is fixed on the predetermined object.

In some optional embodiments of the present disclosure, the predetermined object can be an object that is movable relative to the world coordinate system (which may also be referred to as a global coordinate system). For example, the predetermined object may be a movable platform such as a vehicle, a ship, an airplane, a train, an elevator, or may be the body of a user. It can be understood that the term "world coordinate system" in the present disclosure can be a reference coordinate system for reference, and its specific setting is not limited herein.

In some other optional embodiments of the present disclosure, the predetermined object can be an object that is immovable relative to the world coordinate system, such as a wall surface, or the ground.

In order to ensure application effects of the relative orientation in various usage scenarios, certain measures need to be taken to improve accuracy and reliability of the relative orientation. Through the method for determining the relative orientation provided in the embodiments of the present disclosure, the state variables of the two devices can be corrected based on observation data, and the relative orientation of the two devices can be obtained according to the corrected orientations of the two devices. The method is applicable to both a static and stable external magnetic field and an external magnetic field that changes over time, thereby ensuring accuracy and reliability of the relative orientation.

Exemplary System

In the embodiments of the present disclosure, the relative orientation can be corrected by using the Kalman filter algorithm in the non-inertial system, the least square method in the non-inertial system, or other optimization algorithms. The following method embodiments mainly take the situation of using the Kalman filter algorithm as an example for introduction, and a brief explanation of the principle of the Kalman filter algorithm is first given herein.

Generally speaking, the idea of the Kalman filter algorithm is as follows: a linear system state equation is used, and through the input and output observation data of the system, the system state is optimally estimated. The Kalman filter algorithm can usually be divided into two stages, namely, a prediction stage and an update stage.

The prediction stage can be represented by the following formulas:

$$\overline{x}_k = A_k\hat{x}_{k-1} + u_k$$

$$\overline{P}_k = A_k\hat{P}_{k-1}A_k^T + R$$

The update stage can be represented by the following formulas:

$$K = \overline{P}_kC_k^T\left(C_k\overline{P}_kC_k^T + Q\right)^{-1}$$

$$\hat{x}_k = \overline{x}_k + K(z_k - C_k\overline{x}_k)$$

$$\hat{P}_k = (I - KC_k)\overline{P}_k$$

Wherein the lowercase letter k, as a subscript of the parameter, represents a certain time. The uppercase letter represents the Kalman gain, $\overline{x}_k$ represents the prior state estimation value at the k-th time, $A_k$ represents a state transition matrix at the k-th time, $\hat{x}_{k-1}$ represents the posterior state estimation value at the (k−1)-th time (that is, the optimal estimation of the system state at the (k−1)-th time), $u_k$ represents a result obtained by transforming the input at the k-th time using the matrix that converts the input into the state, $\overline{P}_k$ represents the prior estimation covariance at the k-th time, $\hat{P}_{k-1}$ represents the posterior estimation covariance at the (k−1)-th time, R represents the process excitation noise covariance, $C_k$ represents a transition matrix from state quantity to measurement (observation), $$C_k^T$$

represents a transposed effect of $C_k$, Q represents the measurement noise covariance, $\hat{x}_k$ represents the posterior state estimation value at the k-th time (that is, the optimal estimation of the system state at the k-th time), $z_k$ represents the measurement value (observation value) at the k-th time, $z_k - C_k\overline{x}_k$ represents the residual between the actual observation and the predicted observation at the k-th time, $K(z_k - C_k\overline{x}_k)$ represents the correction amount used when the posterior state estimation value at the k-th time is obtained from the prior state estimation value at the k-th time, and $\hat{P}_k$ represents the posterior estimation covariance at the k-th time.

Exemplary Method

Embodiments of the present disclosure provide a method for displaying images on a head-mounted display device. By using the method provided in the embodiments of the present disclosure, a relative orientation between the head-mounted display device and the target device can be corrected, and the target device can serve as a predetermined object described above.

The head-mounted display device and the target device can be located in the same magnetic field environment (for ease of description, the magnetic field environment will be referred to as the target magnetic field environment hereinafter).

In an optional embodiment of the present disclosure, the target magnetic field environment can be a magnetic field environment that does not change over time. For example, both the head-mounted display device and the target device are located outdoors, and the target magnetic field environment is the earth magnetic field environment. For another example, both the head-mounted display device and the target device are located in a stable indoor magnetic field environment.

In another optional embodiment of the present disclosure, the target magnetic field environment can also be a magnetic field environment that changes over time. For example, both the head-mounted display device and the target device are located on a platform that has its own magnetic field, and this platform moves freely within another larger magnetic field environment (such as the earth magnetic field environment).

Embodiments of the present disclosure may involve three coordinate systems, namely, a first device coordinate system of the head-mounted display device, a second device coordinate system of the target device, and the world coordinate system. The first device coordinate system can be a three-dimensional coordinate system constructed with a center of mass or other position point of the head-mounted display device as an origin. Similarly, the second device coordinate system can be a three-dimensional coordinate system constructed with a center of mass or other position point of a target device as an origin. In the world coordinate system, one of the coordinate axes is aligned with the direction of gravity, and the other two coordinate axes extend horizontally and are perpendicular to each other.

In order to correct a relative orientation between the head-mounted display device and the target device, the head-mounted display device can be provided with a first magnetometer and a first gyroscope, and the target device can be provided with a second magnetometer and a second gyroscope. The head-mounted display device can also be provided with a first accelerometer. The target device can also be provided with a second accelerometer. Both the first magnetometer and the second magnetometer can be three-axis magnetometers. Both the first gyroscope and the second gyroscope can be three-axis gyroscopes. Both the first accelerometer and the second accelerometer can be three-axis accelerometers.

In an optional embodiment of the present disclosure, the relative orientation can be corrected at certain time intervals, and the time intervals between any two adjacent correction times can be 1 millisecond, 10 milliseconds, 1 second, 2 seconds, 3 seconds, etc. The time interval between two adjacent correction times can be greater than or equal to the time interval for collecting observation data.

According to five formulas involved in the Kalman filter algorithm mentioned above, the current correction time can be represented as time k, the previous correction time of the current correction time can be represented as time $k-1$, and the next correction time of the current correction time can be represented as time $k+1$. In this way, the previous correction time, the current correction time, and the next correction time can all have corresponding prior state estimation values, posterior state estimation values, prior estimation covariances, and posterior estimation covariances.

In an optional embodiment of the present disclosure, a prior state estimation value at any correction time can be used as the predicted state variable at that correction time. The posterior state estimation value at any correction time can be used as the corrected state variable at that correction time. The prior estimation covariance at any correction time can be used as a predicted covariance corresponding to the predicted state variable at that correction time. The posterior estimation covariance at any correction time can be used as the corrected covariance corresponding to the corrected state variable at that correction time.

FIG. 1 is a flow diagram of a method for displaying images on a head-mounted display device provided in an exemplary embodiment of the present disclosure. The method shown in FIG. 1 can include step 120, step 140, step 160 and step 180, and each of the steps is illustrated below respectively.

Step 120: acquiring predicted state variables and observation data at a current correction time.

In an optional embodiment of the present disclosure, the predicted state variables include: the first predicted orientation of the head-mounted display device in the world coordinate system, the second predicted orientation of the target device in the world coordinate system, the first predicted bias parameter of the first magnetometer arranged on the head-mounted display device, and the second predicted bias parameter of the second magnetometer arranged on the target device. The target device is a device associated with the image display of the head-mounted display device. The observation data includes at least one of the data collected by the first magnetometer and the second magnetometer, and the data collected by at least one of the first accelerometer arranged on the head-mounted display device and the second accelerometer arranged on the target device.

The first predicted orientation can represent relative rotation between the first device coordinate system and the world coordinate system at the current correction time obtained through prediction. The second predicted orientation can represent relative rotation between the second device coordinate system and the world coordinate system at the current correction time obtained through prediction. The first predicted bias parameter can represent the magnitude of the bias of the first magnetometer at the current correction time obtained through prediction. The second predicted bias parameter can represent the magnitude of the bias of the second magnetometer at the current correction time obtained through prediction.

The bias of a magnetometer is an internal parameter of the magnetometer and may include soft magnetic bias, hard magnetic bias, etc. Generally, the influence of hard magnetic bias is much greater than that of soft magnetic bias. Therefore, the bias parameters involved in the embodiments of the present disclosure may only consider hard magnetic bias parameters.

The observation data may include data collected by the first magnetometer and the second magnetometer. Alternatively, the observation data may include data collected by at least one of the first accelerometer and the second accelerometer, or the observation data may include data collected by the first magnetometer and the second magnetometer, as well as the data collected by at least one of the first accelerometer and the second accelerometer.

It should be noted that when acceleration measurement data is used for correction, either the head-mounted display device or the target device can be configured with an accelerometer, therefore, when a device configured with the accelerometer is in a preset state, data collected by the configured accelerometer can be used to assist in correcting the state variables.

In an optional embodiment of the present disclosure, the target device can include one of the following:

a movable platform on which the head-mounted display device is located;

a control device paired with the head-mounted display device; and a portable device paired with the head-mounted display device.

If the target device is the movable platform on which the head-mounted display device is located, then the target device includes but is not limited to vehicles, ships, airplanes, trains, elevators. By referring to the relative orientation between the head-mounted display device and the target device, the display image displayed by the head-mounted display device is adjusted, and the achievable effects include but are not limited to: when the target device moves or turns, the display image in a virtual space of the head-mounted display device is anchored relative to the target device.

If the target device is a control device paired with the head-mounted display device, the target device includes but is not limited to a movable phone, a handle, an adapter, a finger ring used to control the head-mounted display device. By referring to the relative orientation between the head-mounted display device and the target device, the display image displayed by the head-mounted display device is adjusted, and the achievable effects include but are not limited to: when the target device moves, virtual objects (such as rays, virtual hands, etc.) in the display image of a virtual space rendered by the head-mounted display device can be anchored to the orientation of the target device without deviation. The adapter is a computing unit that can provide computing power for the head-mounted display device and can undertake all or part of the computing power required by the head-mounted display device.

If the target device is a portable device paired with the head-mounted display device, the target device can be placed at any position according to actual needs. For example, the target device can be placed on a predetermined object such as a vehicle, a ship, an airplane, a train, the body of a user, a wall surface, or the ground. The target device may be provided with structures such as hooks, clips, suction cups or magnets for fixing to the predetermined object. In this way, by referring to the data collected by sensors respectively configured on the head-mounted display device and the target device, the relative orientation between the head-mounted display device and the predetermined object can also be determined.

In an optional embodiment of the present disclosure, data collected by the first magnetometer in the observation data may refer to real data collected by the first magnetometer at the current correction time. Alternatively, data collected by the first magnetometer at the current correction time may be estimated through calculation by using the real data collected by the first magnetometer at several times adjacent to the current correction time. The data collected by the second magnetometer, the data collected by the first accelerometer, and the data collected by the second accelerometer in the observation data follow the same principle, and will not be repeated redundantly herein.

Step 140: determining corrected state variables at a current correction time based on the predicted state variables and the observation data at the current correction time.

In an optional embodiment of the present disclosure, the corrected state variables include: a first corrected orientation of the head-mounted display device in the world coordinate system, a second corrected orientation of the target device in the world coordinate system, a first corrected bias parameter of the first magnetometer, and a second corrected bias parameter of the second magnetometer. The first predicted bias parameter at the current correction time is equal to the corrected bias parameter of the first magnetometer at a previous correction time; and the second predicted bias parameter at the current correction time is equal to the corrected bias parameter of the second magnetometer at the previous correction time. The first predicted orientation at the current correction time is obtained by adding a first angular variation of the head-mounted display device at the current correction time to the corrected orientation of the head-mounted display device at the previous correction time, and the second predicted orientation at the current correction time is obtained by adding a second angular variation of the target device at the current correction time to a corrected orientation of the target device at the previous correction time. The first angular variation of the head-mounted display device at the current correction time includes an integral value of angular velocity data collected by a first gyroscope mounted on the head-mounted display device from the previous correction time to the current correction time, and the second angular variation of the target device at the current correction time includes an integral value of angular velocity data collected by a second gyroscope mounted on the target device from the previous correction time to the current correction time.

The corrected state variables at the previous correction time can include: a third corrected orientation of the head-mounted display device in the world coordinate system at the previous correction time, a fourth corrected orientation of the target device in the world coordinate system at the previous correction time, a third corrected bias parameter of the first magnetometer at the previous correction time, and a fourth corrected bias parameter of the second magnetometer at the previous correction time.

By integrating the angular velocity data collected by the first gyroscope from the previous correction time to the current correction time, a corresponding integral value can be obtained. This integral value can represent the angular variation of the head-mounted display device relative to the world coordinate system during a period from the previous correction time to the current correction time, and this angular variation can be used as the first angular variation. By superimposing the first angular variation with the third corrected orientation, the predicted orientation of the head-mounted display device in the world coordinate system at the current correction time can be obtained, and the obtained predicted orientation can be used as the first predicted orientation. The second predicted orientation can be determined in a similar manner, and will not be repeated redundantly herein.

In addition, the third corrected bias parameter in the corrected state variable at the previous correction time can be directly used as the first predicted bias parameter, and the fourth corrected bias parameter in the corrected state variable at the previous correction time can be used as the second predicted bias parameter. In this way, the predicted state variables including the first predicted orientation, the second predicted orientation, the first predicted bias parameter, and the second predicted bias parameter can be obtained, that is, the predicted state variables at the current correction time are obtained.

In step 140, the predicted state variables at the current correction time can be corrected by using the observation data at the current correction time to obtain the corrected state variables at the current correction time.

In an optional embodiment of the present disclosure, the observation data can be considered as real observed quantity. Using the predicted state variables, the predicted observed quantity can be obtained through calculation. The residual between the real observed quantity and the predicted observed quantity can correspond to $z_k - C_k\hat{x}_k$ in the Kalman filter algorithm. In this way, by utilizing the residual between the real observed quantity and the predicted observed quantity, each parameter in the predicted state variables at the current correction time can be corrected. Therefore, the correction result of the first predicted orientation, the correction result of the second predicted orientation, the correction result of the first predicted bias parameter, and the correction result of the second predicted bias parameter can be obtained. For specific correction process, please refer to relevant technologies, which will not be elaborated in the present disclosure.

The correction result of the first predicted orientation can be taken as the first corrected orientation, the correction result of the second predicted orientation can be taken as the second corrected orientation, the correction result of the first predicted bias parameter can be taken as the first corrected bias parameter, and the correction result of the second predicted bias parameter can be taken as the second corrected bias parameter. In this way, the corrected state variables including the first corrected orientation, the second corrected orientation, the first corrected bias parameter, and the second corrected bias parameter can be obtained, that is, the corrected state variables at the current correction time are obtained.

It should be noted that the first corrected bias parameter and the second corrected bias parameter can serve as two predicted bias parameters in the predicted state variables at the next correction time. The first corrected orientation and the second corrected orientation can be used as components of the two predicted orientations in the predicted state variables at the next correction time. For the specific determination method, please refer to the description of the determination methods for the first predicted orientation and the second predicted orientation above, and details will not be elaborated herein.

Step 160: determining a relative orientation between the head-mounted display device and the target device based on the first corrected orientation and the second corrected orientation.

The relative orientation between the head-mounted display device and the target device refers to an orientation of the head-mounted display device in the coordinate system of the target device, that is, the relative orientation of the head-mounted display device relative to the target device.

Assuming that the first corrected orientation is represented as ${}^{G}R_{I1}'$, the second corrected orientation is represented as ${}^{G}R_{I2}'$, and the relative orientation between the head-mounted display device and the target device is represented as ${}^{I2}R_{I1}$, the first corrected orientation, the second corrected orientation, and the relative orientation can satisfy the following formula:

$${}^{G}R_{I1}' = {}^{G}R_{I2}' * {}^{I2}R_{I1}$$

In this way, ${}^{G}R_{I1}'$ and ${}^{G}R_{I2}'$ are substituted into the above formula, and ${}^{I2}R_{I1}$, which serves as the relative orientation, can be calculated efficiently and reliably.

In an optional embodiment of the present disclosure, the relative orientation between the head-mounted display device and the target device may also refer to the orientation of the target device in the coordinate system of the head-mounted display device, that is, the relative orientation ${}^{I1}R_{I2}$ of the target device relative to the head-mounted display device.

The present disclosure provides a method for calculating the relative orientation without limiting which coordinate system is used as a basic coordinate system for calculation. Those skilled in the art can make a selection according to actual needs.

Of course, the determination method of the relative orientation is not limited hereto. For example, at least two optimization algorithms can be used to optimize the predicted state variables at the current correction time respectively. In this way, at least two first corrected orientations in one-to-one correspondence with the at least two optimization algorithms and at least two second corrected orientations in one-to-one correspondence with the at least two optimization algorithms can be obtained. ${}^{G}R_{I1}'$ in the above formula can adopt a fusion result of the at least two first corrected orientations (which can be obtained by direct weighted summation or averaging), and ${}^{G}R_{I2}'$ in the above formula can adopt a fusion result of the at least two second corrected orientations.

Step 180: rendering a to-be-displayed image of the head-mounted display device based on the relative orientation, so as to display the to-be-displayed image through the head-mounted display device.

In an optional embodiment of the present disclosure, a rendering engine of the head-mounted display device may render the to-be-displayed image with reference to the relative orientation, and update the obtained rendering result to a display screen of the head-mounted display device for display.

In another optional embodiment of the present disclosure, the relative orientation can be referred to for rendering the to-be-displayed image, and the display position of the to-be-displayed image in the display screen of the head-mounted display device can be adjusted.

In the embodiments of the present disclosure, data are collected through sensors such as magnetometers and accelerometers arranged on the head-mounted display device and the target device, such that observation data can be acquired. The acquired observation data can be used to correct the predicted state variables at the current correction time. Therefore, the corrected orientations of the head-mounted display device and the target device in the world coordinate system can be obtained. Based on the corrected orientations of the head-mounted display device and the target device in the world coordinate system, the relative orientation between the head-mounted display device and the target device can be accurately determined, thereby being equivalent to correcting the relative orientation between the head-mounted display device and the target device, being conducive to improving the estimation accuracy of the relative orientation, and ensuring the application effects of the relative orientation in various usage scenarios.

Figure 2:
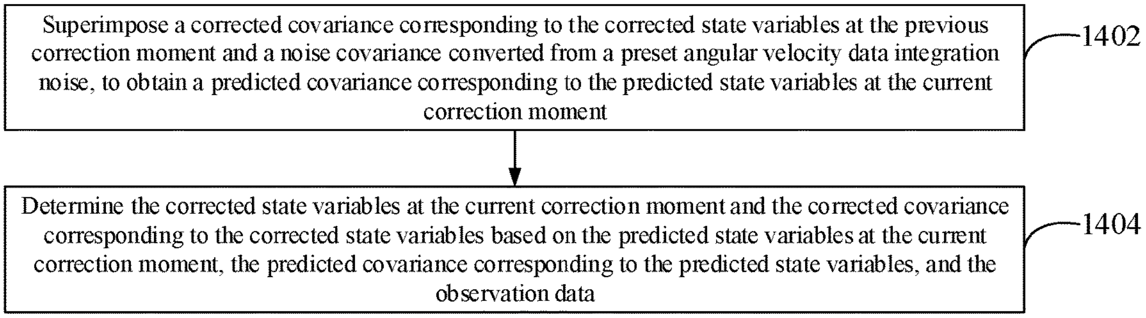
FIG. 2 is a flow diagram of a method for displaying images on a head-mounted display device provided in another exemplary embodiment of the present disclosure.

On the basis of the embodiment shown in FIG. 1, as shown in FIG. 2, step 140 includes step 1402 and step 1404.

Step 1402: superimposing a corrected covariance corresponding to the corrected state variables at the previous correction time and a noise covariance converted from a preset angular velocity data integration noise, to obtain a predicted covariance corresponding to the predicted state variables at the current correction time.

The preset angular velocity data integration noise refers to the preset noise introduced in the process of integrating the angular velocity data of the gyroscope.

In an optional embodiment of the present disclosure, a conversion relationship between noise and covariance (hereinafter referred to as the first conversion relationship for ease of description) may be preset. The first conversion relationship is used to make the noise be positively correlated with covariance. For example, the first conversion relationship may be in the form of a monotone increasing function. According to the first conversion relationship, the preset angular velocity data integration noise can be converted into a corresponding covariance, and the converted covariance can be used as the noise covariance.

In an optional embodiment of the present disclosure, the corrected covariance corresponding to the corrected state variables at the previous correction time can be directly added to the noise covariance, and the resulting sum can be used as the predicted covariance corresponding to the predicted state variables at the current correction time. Alternatively, weights can be assigned to the corrected covariance corresponding to the corrected state variables at the previous correction time and the noise covariance respectively, and by using the assigned weights, a weighted summation of the corrected covariance corresponding to the corrected state variables at the previous correction time and the noise covariance can be performed, and the resulting weighted sum can be used as the predicted covariance corresponding to the predicted state variables at the current correction time.

Step 1404: determining the corrected state variables at the current correction time and the corrected covariance corresponding to the corrected state variables based on the predicted state variables at the current correction time, the predicted covariance corresponding to the predicted state variables, and the observation data.

Step 1404 includes a plurality of implementation forms, which will be respectively introduced below.

Figure 3:
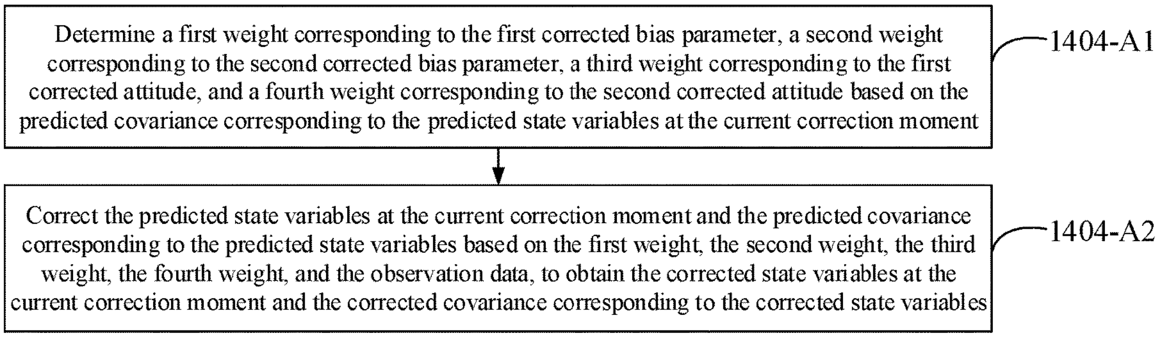
FIG. 3 is a flow diagram of a method for displaying images on a head-mounted display device provided in yet another exemplary embodiment of the present disclosure.

One implementation form of step 1404:

As shown in FIG. 3, step 1404 includes step 1404-A1 and step 1404-A2.

Step S1404-A1: determining a first weight corresponding to the first corrected bias parameter, a second weight corresponding to the second corrected bias parameter, a third weight corresponding to the first corrected orientation, and a fourth weight corresponding to the second corrected orientation based on the predicted covariance corresponding to the predicted state variables at the current correction time.

In an optional embodiment of the present disclosure, the above first conversion relationship can be used to convert the predicted covariance corresponding to the predicted state variables at the current correction time. The conversion result may include respective noises corresponding to the first corrected bias parameter, the second corrected bias parameter, the first corrected orientation, and the second corrected orientation.

In an optional embodiment of the present disclosure, a conversion relationship between noise and weight (hereinafter referred to as the second conversion relationship for ease of description) may be preset. The second conversion relationship is used to make the noise be negatively correlated with the weight. For example, the second conversion relationship may be in the form of a monotone decreasing function. According to the second conversion relationship, each noise included in the conversion result can be converted into a weight. Therefore, the first weight corresponding to the first corrected bias parameter, the second weight corresponding to the second corrected bias parameter, the third weight corresponding to the first corrected orientation, and the fourth weight corresponding to the second corrected orientation can be obtained.

The above describes the case in which the predicted covariance corresponding to the predicted state variables at the current correction time is first converted into noise, and then the noise is converted into a weight. During specific implementation, a conversion relationship between the predicted state variables and weights (hereinafter referred to as the third conversion relationship for ease of description) may also be directly set. According to the third conversion relationship, the first weight to the fourth weight can be directly obtained by converting the predicted covariance corresponding to the predicted state variables at the current correction time.

Step 1404-A2: correcting the predicted state variables at the current correction time and the predicted covariance corresponding to the predicted state variables based on the first weight, the second weight, the third weight, the fourth weight, and the observation data, to obtain the corrected state variables at the current correction time and the corrected covariance corresponding to the corrected state variables.

In an optional embodiment of the present disclosure, the observation data at the current correction time includes: first magnetic force measurement data of the first magnetometer at the current correction time and second magnetic force measurement data of the second magnetometer at the current correction time.

Then step 1404-A2 includes:

- determining a fifth weight corresponding to an error of a magnetic constraint condition at the current correction time based on the first predicted orientation, a first noise corresponding to the first magnetic force measurement data, the second predicted orientation, and a second noise corresponding to the second magnetic force measurement data, wherein the magnetic constraint condition at the current correction time is defined by the first corrected orientation, the second corrected orientation, the first magnetic force measurement data, the second magnetic force measurement data, the first corrected bias parameter, and the second corrected bias parameter at the current correction time; and
- correcting the predicted state variables at the current correction time and the predicted covariance corresponding to the predicted state variable based on the first weight, the second weight, the third weight, the fourth weight, the first magnetic force measurement data, the second magnetic force measurement data, and the fifth weight, to obtain the corrected state variables at the current correction time and the corrected covariance corresponding to the corrected state variables.

Herein, the first magnetic force measurement data can be represented as $m_1$, the second magnetic force measurement data can be represented as $m_2$, the first corrected orientation at the current correction time can be represented as ${}^{G}R_{I1}'$, the second corrected orientation at the current correction time can be represented as ${}^{G}R_{I2}'$, the first corrected bias parameter can be represented as $b_{m1}'$, the second corrected bias parameter can be represented as $b_{m2}'$, and the target environment magnetic field can be represented as Gm.

Assuming that there are no errors at all in the first corrected orientation, the second corrected orientation, the first corrected bias parameter, and the second corrected bias parameter, the following formulas can be established:

$$m_1 = {}^{G}R_{I1}' * G_m + b_{m1}'$$

$$m_2 = {}^{G}R_{I2}' * G_m + b_{m2}'$$

By transforming the above two formulas to eliminate $G_m$, the following formula for representing the magnetic constraint condition at the current correction time can be obtained:

$$^{G}R'_{I1} * (m_1 - b'_{m1}) = {}^{G}R'_{I2} * (m_2 - b'_{m2})$$

The above discussion is merely a theoretical situation. During actual implementation, errors inevitably exist in the first corrected orientation, the second corrected orientation, the first corrected bias parameter, and the second corrected bias parameter. Therefore, $^{G}R_{I1}'*(m_1-b_{m1}')$ is not equal to $^{G}R_{I2}'*(m_2-b_{m2}')$. Then, based on the difference between $^{G}R_{I1}'*(m_1-b_{m1}')$ and $^{G}R_{I2}'*(m_2-b_{m2}')$, the error corresponding to the magnetic constraint condition at the current correction time can be determined. For example, the difference between $^{G}R_{I1}'*(m_1-b_{m1}')$ and $^{G}R_{I2}'*(m_2-b_{m2}')$ can be directly used as the error corresponding to the magnetic constraint condition at the current correction time. For another example, the square of the difference between $^{G}R_{I1}'*(m_1-b_{m1}')$ and $^{G}R_{I2}'*(m_2-b_{m2}')$ can be used as the error corresponding to the magnetic constraint condition at the current correction time. Subsequently, a corresponding fifth weight can be determined for the error of the magnetic constraint condition at the current correction time.

In an optional embodiment of the present disclosure, the determining a fifth weight corresponding to an error of a magnetic constraint condition based on the first predicted orientation, a first noise corresponding to the first magnetic force measurement data, the second predicted orientation, and a second noise corresponding to the second magnetic force measurement data includes:

summing a first multiplication result and a second multiplication result to obtain a summation result, wherein the first multiplication result includes a result of multiplying the first predicted orientation, the first noise, and a transposed result of the first predicted orientation. The second multiplication result includes a result of multiplying the second predicted orientation, the second noise, and a transposed result of the second predicted orientation; and determining the fifth weight corresponding to an error of the magnetic constraint condition based on the summation result, wherein the fifth weight is negatively correlated with the summation result.

By referring to the corrected covariance corresponding to the corrected state variables at the previous correction time, an optimal measurement noise for the first magnetometer can be determined (for example, a conversion relationship between covariance and measurement noise similar to the first conversion relationship exists). In addition, a measurement noise can also be preset for the first magnetometer. By fusing these two measurement noises, a first noise corresponding to the first magnetic force measurement data can be obtained. For example, these two measurement noises can be square-rooted respectively, and the two obtained square-rooted results can be summed, and the obtained summation result is square-rooted, and the square-rooted result can be used as the first noise corresponding to the first magnetic force measurement data. Alternatively, the result obtained by directly adding these two measurement noises can be used as the first noise corresponding to the first magnetic force measurement data. The second noise corresponding to the second magnetic force measurement data can be obtained in a similar manner, and will not be repeated redundantly herein.

Herein, the first predicted orientation can be represented as $^{G}R_{I1}$, the first noise corresponding to the first magnetic force measurement data can be represented as $N_1$, the transposed result of the first predicted orientation can be represented as $^{G}R_{I1}^{T}$, the second predicted orientation can be represented as $^{G}R_{I2}$, the second noise corresponding to the second magnetic force measurement data can be represented as $N_2$, and the transposed result of the second predicted orientation can be represented as $^{G}R_{I2}^{T}$. The first multiplication result may be represented as $^{G}R_{I1}*N_1*{}^{G}R_{I1}^{T}$, the second multiplication result may be represented as $^{G}R_{I2}*N_2*{}^{G}R_{I2}^{T}$, and the summation result of the first multiplication result and the second multiplication result may be represented as $^{G}R_{I1}*N_1*{}^{G}R_{I1}^{T}+{}^{G}R_{I2}*N_2*{}^{G}R_{I2}^{T}$.

In an optional embodiment of the present disclosure, the summation result may be directly converted into a weight according to the second conversion relationship, and the weight obtained from conversion may be directly used as the fifth weight. Alternatively, the summation result may be first converted into a weight according to the second conversion relationship, and then the weight obtained from conversion may be subjected to a predetermined processing. For example, the weight obtained from conversion is multiplied by a preset coefficient, and the processed weight is used as the fifth weight.

In this way, through simple arithmetic logic such as transposition operation, multiplication operation, and addition operation, the fifth weight corresponding to the error of the magnetic constraint condition can be determined efficiently and reliably, such that the fifth weight corresponding to the error of the magnetic constraint condition can be used for correcting the predicted state variables. Since the magnetic constraint condition is not affected by the changing magnetic field and the data measured by the magnetometer can always construct the magnetic constraint condition, the magnetic constraint condition is introduced to improve the accuracy and reliability of the correction result.

In an optional embodiment of the present disclosure, the correcting the predicted state variables at the current correction time based on the first weight, the second weight, the third weight, the fourth weight, the first magnetic force measurement data, the second magnetic force measurement data and the fifth weight includes:

correcting the predicted state variables at the current correction time with an object of minimizing a target error.

In an optional embodiment of the present disclosure, the target error is the sum of a first error and a second error.

The first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, and the second error satisfies: $e2=w5*[{}^{G}R_{I1}'(m_1-b_{m1}')-{}^{G}R_{I2}'(m_2-b_{m2}')]^2$, wherein e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, $^{G}R_{I1}'$ represents the first corrected orientation, $^{G}R_{I1}$ represents the first predicted orientation, w4 represents the fourth weight, $^{G}R_{I2}'$ represents the second corrected orientation, $^{G}R_{I2}$ represents the second predicted orientation, e2 represents the second error, w5 represents the fifth weight, $m_1$ represents the first magnetic force measurement data, and $m_2$ represents the second magnetic force measurement data.

Herein, an optimization function f(x) can be constructed, wherein f(x)=e1+e2. By substituting the first weight, the second weight, the third weight, the fourth weight, the first magnetic force measurement data, the second magnetic force measurement data, and the fifth weight into the optimization function, and through the application of an optimization algorithm (such as the Kalman filter algorithm), $b_{m1}'$, $b_{m2}'$, ${}^{G}R_{I1}'$, and ${}^{G}R_{I2}'$ that minimize the value of f(x) can be efficiently and reliably obtained. Therefore, the corrected state variables including $b_{m1}'$, $b_{m2}'$, ${}^{G}R_{I1}'$, and ${}^{G}R_{I2}'$ can be obtained, that is, the corrected state variables at the current correction time are obtained.

It should be noted that, with reference to the formulas related to the Kalman filter algorithm described above, it can be known that the process of obtaining the posterior state estimation value at time k from the prior state estimation value at time k requires the use of K and $C_k$. Therefore, in the process of correcting the corrected state variables at the current correction time, the corresponding K and $C_k$ can be obtained. Moreover, the predicted covariance corresponding to the predicted state variables at the current correction time can be considered to be known. Then, by substituting the obtained corresponding K and $C_k$ and the predicted covariance corresponding to the predicted state variables at the current correction time into the last formula of the five formulas involved in the Kalman filter algorithm, the corresponding $\hat{P}_k$ can be obtained. The obtained $\hat{P}_k$ can be used as the corrected covariance corresponding to the corrected state variables at the current correction time. The corrected covariance corresponding to the corrected state variables at the current correction time can be used as a component of the predicted covariance corresponding to the predicted state variables at the next correction time. For the specific determination method, please refer to the description of the determination method for the predicted covariance corresponding to the predicted state variables at the current correction time above, and details will not be elaborated herein.

In this way, by adopting a first implementation form of step 1404, the predicted state variables and the predicted covariance can be efficiently and reliably corrected through the application of the magnetic constraint condition, thereby being conducive to ensuring application effects of the relative orientation in various usage scenarios.

Another implementation form of step 1404:

in an optional embodiment of the present disclosure, the observation data at the current correction time includes: first acceleration measurement data of the first accelerometer at the current correction time and second acceleration measurement data of the second accelerometer at the current correction time.

Figure 4:
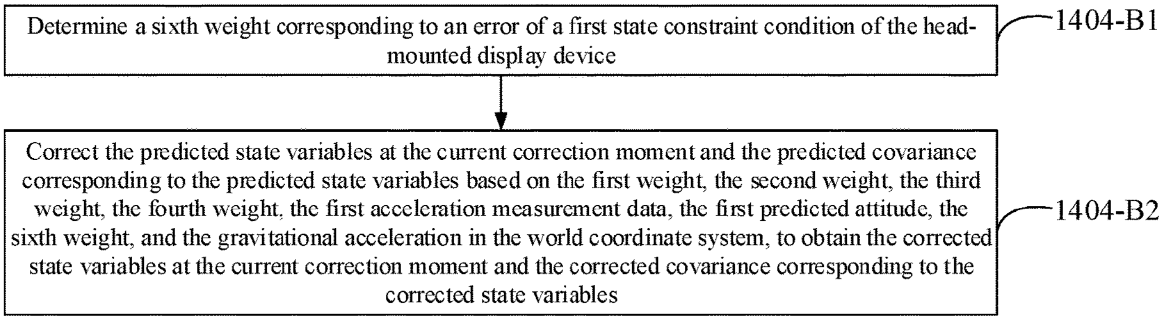
FIG. 4 is a flow diagram of a method for displaying images on a head-mounted display device provided in still another exemplary embodiment of the present disclosure.

As shown in FIG. 4, for the case where the head-mounted display device is in a first preset state, step 1404 includes step 1404-B1 and step 1404-B2.

Step 1404-B1: determining a sixth weight corresponding to an error of a first state constraint condition of the head-mounted display device, wherein the first preset state includes at least one of the following: a stationary state and a uniform linear motion state, and the first state constraint condition is defined by the first predicted orientation, the first acceleration measurement data, and gravitational acceleration in the world coordinate system at the current correction time.

Herein, the first predicted orientation can be represented as ${}^{G}R_{I1}$, the first acceleration measurement data can be represented as $a_{m1}$, and the gravitational acceleration in the world coordinate system can be represented as ${}^{G}g$.

Herein, the acceleration data collected by the first accelerometer within a recent period of time (such as within the last 0.1 second, within the last 0.2 second, within the last 0.5 second, etc.) can be statistically analyzed to determine the variance corresponding to the acceleration data collected by the first accelerometer within the recent period of time (for the convenience of description, it will be referred to as the target variance hereinafter). If the target variance is less than a set threshold, it can be determined that the head-mounted display device is in a stationary state or a uniform linear motion state. In this case, if there is no error in both ${}^{G}R_{I1}$ and $a_{m1}$, the following formula can apply:

$$^{G}R_{I1} * a_{m1} = -{}^{G}g$$

By transforming the above formula, the following formula for representing the first state constraint condition of the head-mounted display device can be obtained:

$$^{G}R_{I1} * a_{m1} + {}^{G}g = 0$$

The above discussion is only a theoretical situation. During actual implementation, errors inevitably exist in ${}^{G}R_{I1}$ and $a_{m1}$. Therefore, ${}^{G}R_{I1}*a_{m1}+{}^{G}g$ is not equal to 0. Then, based on the difference between ${}^{G}R_{I1}*a_{m1}+{}^{G}g$ and 0, the error corresponding to the first state constraint condition of the head-mounted display device can be determined. For example, ${}^{G}R_{I1}*a_{m1}+{}^{G}g$ can be directly used as the error corresponding to the first state constraint condition of the head-mounted display device. For another example, the square of ${}^{G}R_{I1}*a_{m1}+{}^{G}g$ can be used as the error corresponding to the first state constraint condition of the head-mounted display device. Subsequently, a corresponding sixth weight can be determined for the error corresponding to the first state constraint condition of the head-mounted display device.

In an optional embodiment of the present disclosure, the determining a sixth weight corresponding to an error of a first state constraint condition of the head-mounted display device includes:

- determining the first measurement value fluctuation evaluation parameter of the first acceleration measurement data; and
- determining the sixth weight based on the first measurement value fluctuation evaluation parameter.

In an optional embodiment of the present disclosure, the sixth weight can be negatively correlated with the first measurement value fluctuation evaluation parameter.

In an optional embodiment of the present disclosure, the target variance can be directly used as the first measurement value fluctuation evaluation parameter of the first acceleration measurement data. Alternatively, a product of the target variance and a preset coefficient greater than 0 can be used as the first measurement value fluctuation evaluation parameter of the first acceleration measurement data.

In an optional embodiment of the present disclosure, a conversion relationship between the measurement value fluctuation evaluation parameter and the weight can be preset (the conversion relationship is hereinafter referred to as a fourth conversion relationship for ease of description). The fourth conversion relationship can be used to make the measurement value fluctuation evaluation parameter negatively correlated with the weight. For example, the fourth conversion relationship can be in a form of a monotone decreasing function. According to the fourth conversion relationship, the first measurement value fluctuation evaluation parameter can be converted into a weight, and the converted weight can be directly used as the sixth weight. Alternatively, the first measurement value fluctuation evaluation parameter can be first converted into a weight according to the fourth conversion relationship, and then the weight obtained from conversion can be subjected to predetermined processing. For example, the weight obtained from conversion can be multiplied by a preset coefficient, and the processed weight can be used as the sixth weight.

In an optional embodiment of the present disclosure, when the target variance is less than a set threshold, the sixth weight can be set as a preset weight; and when the target variance is greater than or equal to the set threshold, the sixth weight can be set as 0.

In this way, with reference to a fluctuation law of the measurement value of the first accelerometer, an appropriate sixth weight can be determined for the error of the first state constraint condition of the head-mounted display device, such that the sixth weight corresponding to the error of the first state constraint condition can be used for correcting the predicted state variables. The first state constraint condition is introduced to improve the accuracy and reliability of the correction result.

Step 1404-B2: correcting the predicted state variables at the current correction time and the predicted covariance corresponding to the predicted state variables based on the first weight, the second weight, the third weight, the fourth weight, the first acceleration measurement data, the first predicted orientation, the sixth weight, and the gravitational acceleration in the world coordinate system, to obtain the corrected state variables at the current correction time and the corrected covariance corresponding to the corrected state variables.

In an optional embodiment of the present disclosure, the correcting the predicted state variables at the current correction time and the predicted covariance corresponding to the predicted state variables based on the first weight, the second weight, the third weight, the fourth weight, the first acceleration measurement data, the first predicted orientation, the sixth weight, and the gravitational acceleration in the world coordinate system includes:

- correcting the predicted state variables at the current correction time with an object of minimizing a target error.

In an optional embodiment of the present disclosure, the target error is the sum of a first error and a third error.

The first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, and the third error satisfies: $e3=w6*({}^{G}R_{I1}*a_{m1}+{}^{G}g)^2$.

wherein e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e3 represents the third error, w6 represents the sixth weight, $a_{m1}$ represents the first acceleration measurement data, and ${}^{G}g$ represents the gravitational acceleration in the world coordinate system.

Herein, an optimization function f(x) can be constructed, wherein f(x)=e1+e3. By substituting the first weight, the second weight, the third weight, the fourth weight, the first acceleration measurement data, the first predicted orientation, the sixth weight, and the gravitational acceleration of the world coordinate system into the optimization function, and through the application of an optimization algorithm (such as the Kalman filter algorithm), $b_{m1}'$, $b_{m2}'$, ${}^{G}R_{I1}'$, and ${}^{G}R_{I2}'$ that minimize the value of f(x) can be efficiently and reliably obtained. Therefore, the corrected state variables including $b_{m1}'$, $b_{m2}'$, ${}^{G}R_{I1}'$, and ${}^{G}R_{I2}'$ can be obtained, that is, the corrected state variables at the current correction time are obtained. In a manner similar to the relevant description in an implementation form of step 1404 described above, the correction covariance corresponding to the corrected state variables at the current correction time can also be obtained.

In this way, through the application of the first state constraint condition, the predicted state variables and the predicted covariance can be efficiently and reliably corrected, thereby being conducive to ensuring application effects of the relative orientation in various usage scenarios.

Figure 5:
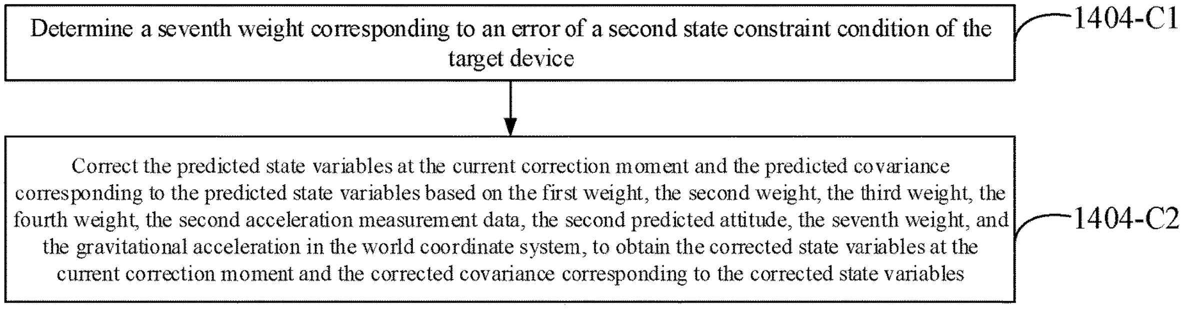
FIG. 5 is a flow diagram of a method for displaying images on a head-mounted display device provided in yet another exemplary embodiment of the present disclosure.

As shown in FIG. 5, for the case where the target device is in a second preset state, step 1404 includes step 1404-C1 and step 1404-C2.

Step 1404-C1: determining a seventh weight corresponding to an error of a second state constraint condition of the target device, wherein the second preset state includes at least one of the following: a stationary state and a uniform linear motion state, and the second state constraint condition is defined by the second predicted orientation, the second acceleration measurement data, and the gravitational acceleration in the world coordinate system at the current correction time.

Step 1404-C2: correcting the predicted state variables at the current correction time and the predicted covariance corresponding to the predicted state variables based on the first weight, the second weight, the third weight, the fourth weight, the second acceleration measurement data, the second predicted orientation, the seventh weight, and the gravitational acceleration in the world coordinate system, to obtain the corrected state variables at the current correction time and the corrected covariance corresponding to the corrected state variables.

In an optional embodiment of the present disclosure, determining a seventh weight corresponding to an error of a second state constraint condition of the target device includes:

- determining a second measurement value fluctuation evaluation parameter of the second acceleration measurement data; and
- determining the seventh weight based on the second measurement value fluctuation evaluation parameter, wherein the seventh weight is negatively correlated with the second measurement value fluctuation evaluation parameter.

In an optional embodiment of the present disclosure, for the case where the target device is in a second preset state, the correcting the predicted state variables at the current correction time based on the first weight, the second weight, the third weight, the fourth weight, the second acceleration measurement data, the second predicted orientation, the seventh weight, and the gravitational acceleration in the world coordinate system includes:

- correcting the predicted state variables at the current correction time with an object of minimizing a target error.

In an optional embodiment of the present disclosure, the target error is the sum of a first error and a fourth error.

The first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, and the fourth error satisfies: $e4=w7*({}^{G}R_{I2}*a_{m2}+{}^{G}g)^2$, Wherein e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e4 represents the fourth error, w7 represents the seventh weight, $a_{m2}$ represents the second acceleration measurement data, and ${}^{G}g$ represents the gravitational acceleration in the world coordinate system.

It should be noted that the implementation manner of the embodiment shown in FIG. 5 is similar to that of the embodiment shown in FIG. 4. For details, please refer to the relevant description of the embodiment shown in FIG. 4, and details will not be elaborated herein.

In this way, through the application of the second state constraint condition, the predicted state variables and the predicted covariance can be efficiently and reliably corrected, thereby being conducive to ensuring application effects of the relative orientation in various usage scenarios.

Still another implementation form of step 1404:

in an optional embodiment of the present disclosure, the observation data at the current correction time includes: first magnetic force measurement data of the first magnetometer at the current correction time, second magnetic force measurement data of the second magnetometer at the current correction time, first acceleration measurement data of the first accelerometer at the current correction time, and second acceleration measurement data of the second accelerometer at the current correction time.

Figure 6:
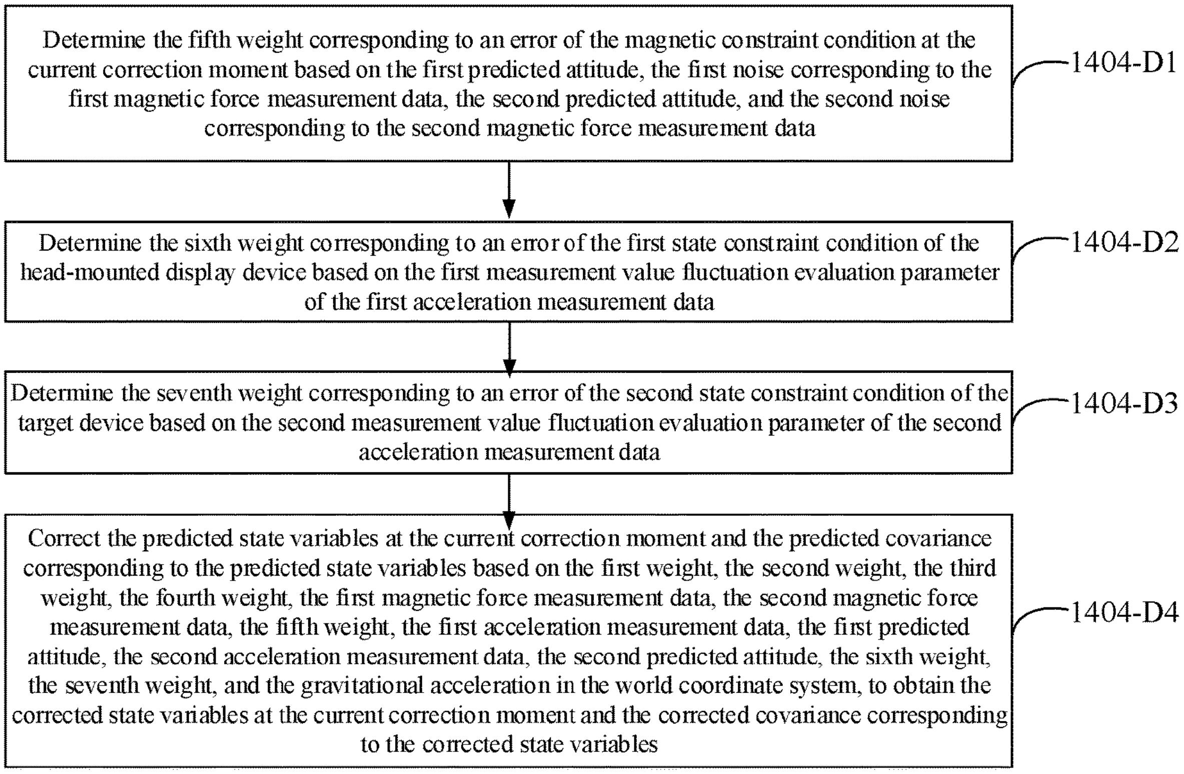
FIG. 6 is a flow diagram of a method for displaying images on a head-mounted display device provided in still another exemplary embodiment of the present disclosure.

As shown in FIG. 6, step 1404 includes step 1404-D1, step 1404-D2, step 1404-D3 and step 1404-D4.

Step 1404-D1: determining the fifth weight corresponding to an error of the magnetic constraint condition at the current correction time based on the first predicted orientation, the first noise corresponding to the first magnetic force measurement data, the second predicted orientation, and the second noise corresponding to the second magnetic force measurement data, wherein the magnetic constraint condition at the current correction time is defined by the first corrected orientation, the second corrected orientation, the first magnetic force measurement data, the second magnetic force measurement data, the first corrected bias parameter, and the second corrected bias parameter at the current correction time.

Step 1404-D2: determining the sixth weight corresponding to an error of the first state constraint condition of the head-mounted display device based on the first measurement value fluctuation evaluation parameter of the first acceleration measurement data, wherein the first state constraint condition is defined by the first predicted orientation, the first acceleration measurement data, and the gravitational acceleration in the world coordinate system at the current correction time.

Step 1404-D3: determining the seventh weight corresponding to an error of the second state constraint condition of the target device based on the second measurement value fluctuation evaluation parameter of the second acceleration measurement data, wherein the second state constraint condition is defined by the second predicted orientation, the second acceleration measurement data, and the gravitational acceleration in the world coordinate system at the current correction time.

It should be noted that for step 1404-D1, step 1404-D2, and step 1404-D3, please refer to the relevant descriptions in the above two implementation forms of step 1404.

Step 1404-D4: correcting the predicted state variables at the current correction time and the predicted covariance corresponding to the predicted state variables based on the first weight, the second weight, the third weight, the fourth weight, the first magnetic force measurement data, the second magnetic force measurement data, the fifth weight, the first acceleration measurement data, the first predicted orientation, the second acceleration measurement data, the second predicted orientation, the sixth weight, the seventh weight, and the gravitational acceleration in the world coordinate system, to obtain the corrected state variables at the current correction time and the corrected covariance corresponding to the corrected state variables.

In an optional embodiment of the present disclosure, step 1404-D4 includes:

correcting the predicted state variables at the current correction time with an object of minimizing a target error.

In an optional embodiment of the present disclosure, the target error is the sum of a first error, a second error, a third error and a fourth error.

The first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, the second error satisfies: $e2=w5*[{}^{G}R_{I1}'(m_1-b_{m1}')-{}^{G}R_{I2}'(m_2-b_{m2}')]^2$, the third error satisfies: $e3=w6*({}^{G}R_{I1}*a_{m1}+{}^{G}g)^2$, and the fourth error satisfies: $e4=w7*({}^{G}R_{I2}*a_{m2}+{}^{G}g)^2$, wherein e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e2 represents the second error, w5 represents the fifth weight, $m_1$ represents the first magnetic force measurement data, $m_2$ represents the second magnetic force measurement data, e3 represents the third error, w6 represents the sixth weight, $a_{m1}$ represents the first acceleration measurement data, ${}^{G}g$ represents the gravitational acceleration in the world coordinate system, e4 represents the fourth error, w7 represents the seventh weight, and $a_{m2}$ represents the second acceleration measurement data.

It should be noted that the specific implementation manner of step 1404-D4 is similar to the method for correcting the predicted state variables at the current correction time with a goal of minimizing the target error in the above two implementation forms of step 1404, and the achievable effects are also similar. The main difference lies in that in step 1404-D4, the magnetic constraint condition, the first state constraint condition, and the second state constraint condition are simultaneously applied. The combination of a plurality of constraint conditions helps to improve the accuracy and reliability of the correction results.

As can be seen from various implementation forms of step 1404 described above, by applying at least one constraint condition selected from the magnetic constraint condition, the first state constraint condition, and the second state constraint condition, the accuracy and reliability of the correction results can be effectively improved when the predicted state variables and the predicted covariance are corrected, thereby reducing the relative orientation error, and improving the estimation accuracy of the relative orientation.

In an optional example, the method provided in embodiments of the present disclosure can further include the following steps:

acquiring a first sequence, wherein the first sequence includes angular velocity measurement data of the first gyroscope at each of a plurality of first measurement times;

acquiring a second sequence, wherein the second sequence includes angular velocity measurement data of the second gyroscope at each of a plurality of second measurement times;

acquiring a third sequence, wherein the third sequence includes the first magnetic force measurement data of the first magnetometer at each of a plurality of third measurement times;

acquiring a fourth sequence, wherein the fourth sequence includes second magnetic force measurement data of the second magnetometer at each of a plurality of fourth measurement times; and performing time synchronization on the first sequence, the second sequence, the third sequence, and the fourth sequence.

In an optional embodiment of the present disclosure, the first gyroscope can perform angular velocity measurement at a fixed first frequency, to obtain angular velocity measurement data of the first gyroscope at each of the plurality of first measurement times. By arranging the obtained angular velocity measurement data in a chronological order from the earliest to the latest measurement time, the first sequence can be obtained.

In an optional embodiment of the present disclosure, the second gyroscope can perform angular velocity measurement at a fixed second frequency, to obtain angular velocity measurement data of the second gyroscope at each of the plurality of second measurement times. By arranging the obtained angular velocity measurement data in a chronological order from the earliest to the latest measurement time, the second sequence can be obtained.

In an optional embodiment of the present disclosure, the first magnetometer can perform magnetic force value measurement at a fixed third frequency, to obtain first magnetic force measurement data of the first magnetometer at each of the plurality of third measurement times. By arranging the obtained first magnetic force measurement data in a chronological order from the earliest to the latest measurement time, the third sequence can be obtained.

In an optional embodiment of the present disclosure, the second magnetometer can perform magnetic force value measurement at a fixed fourth frequency, to obtain second magnetic force measurement data of the second magnetometer at each of the plurality of fourth measurement times. By arranging the obtained second magnetic force measurement data in a chronological order from the earliest to the latest measurement time, the fourth sequence can be obtained.

It should be noted that any two of the first frequency, the second frequency, the third frequency, and the fourth frequency may be the same frequency or different frequencies, which will not be defined in the embodiments of the present disclosure.

It should be noted that the first sequence can be correspondingly regarded as a first time system used during measurement by a first gyroscope, the second sequence can be correspondingly regarded as a second time system used during measurement by a second gyroscope, the third sequence can be correspondingly regarded as a third time system used during measurement by a first magnetometer, and the fourth sequence can be correspondingly regarded as a fourth time system used during measurement by a second magnetometer. These four time systems may not be synchronized. For example, the initial time used by these four time systems may not be the same. For another example, the four frequencies corresponding to these four time systems (i.e., the first frequency to the fourth frequency mentioned above) may not be the same. In this case, if data is directly obtained from the first sequence to the fourth sequence to serve as observation data for correcting predicted state variables, accuracy and reliability of the correction results may be influenced.

In view of this, in the embodiments of the present disclosure, time synchronization can be performed on the first sequence, the second sequence, the third sequence, and the fourth sequence. If any two of the first frequency to the fourth frequency are different, a sequence corresponding to the highest frequency can be selected from the first sequence to the fourth sequence to serve as a reference sequence, and three interpolated sequences with the same frequency as the reference sequence can be obtained by interpolating the remaining three sequences. The specific interpolation method can be linear interpolation.

Assuming that the first sequence to the fourth sequence are represented as L1, L2, L3, and L4 in sequence, if L1 serves as a basic sequence and an interpolated sequence corresponding to L2 is represented as L2', the time difference between L2' and L1 can be determined by utilizing a cross-correlation algorithm.

In an optional example, L1 is shown as follows:

d11, d12, d13, d14, d15 and d16.

Wherein for the first time system, the time corresponding to d11 is 0:00 (i.e., zero second), the time corresponding to d12 is 1:00 (i.e., the first second), the time corresponding to d13 is 2:00, the time corresponding to d14 is 3:00, the time corresponding to d15 is 4:00, and the time corresponding to d16 is 5:00.

L2 is shown as follows:

d21, d22, d23, d24, d25 and d26.

Wherein for the second time system, the time corresponding to d21 is 00:00, the time corresponding to d22 is 1:00, the time corresponding to d23 is 2:00, the time corresponding to d24 is 3:00, the time corresponding to d25 is 4:00, and the time corresponding to d26 is 5:00.

Assuming that the time difference between L2 and L1 is 1 second, during time synchronization, it can be determined that 0:00 in the first time system corresponds to 1:00 in the second time system, 1:00 in the first time system corresponds to 2:00 in the second time system, 2:00 in the first time system corresponds to 3:00 in the second time system, and the subsequent time points are aligned in the same manner, and will not be repeated redundantly herein. Therefore, it can be determined that d11 in L1 is temporally aligned with d22 in L2, d12 in L1 is temporally aligned with d23 in L2, d13 in L1 is temporally aligned with d24 in L2, d14 in L1 is temporally aligned with d25 in L2, and d15 in L1 is temporally aligned with d26 in L2, therefore, L2' is as follows: d22, d23, d24, d25, d26, . . . . These alignment relationships can be combined to form alignment results of the first sequence and the second sequence. In a similar manner, the first sequence, the second sequence, the third sequence, and the fourth sequence can be temporally aligned, thereby yielding corresponding alignment results.

Assuming that the data collected by the first gyroscope in the prediction data in step 120 includes d11, d12, d13, d14, and d15 in L1, and the data collected by the second gyroscope in the prediction data after time synchronization includes d22, d23, d24, d25, and d26 in L2', various types of data used when the predicted state variables are updated are temporally aligned, thereby being conducive to avoiding the situation in which temporal misalignment of data may affect the accuracy and reliability of the correction results, and further improving the estimation accuracy of the relative orientation.

The above discusses the case in which the initial time used by the first sequence is different from the initial time used by the second sequence, and the first frequency is the same as the second frequency. If the first frequency is the same as the second frequency, and the initial time used by the first sequence is the same as the initial time used by the second sequence, it can be considered that d11 in L1 is temporally aligned with d21 in L2, d12 in L1 is temporally aligned with d22 in L2, d13 in L1 is temporally aligned with d23 in L2, d14 in L1 is temporally aligned with d24 in L2, and so on, and details will not be elaborated herein.

In an optional embodiment of the present disclosure, the method can also include the following steps:

- acquiring a fifth sequence, wherein the fifth sequence includes first acceleration measurement data of the first accelerometer at each of a plurality of fifth measurement times; and
- acquiring a sixth sequence, wherein the sixth sequence includes second acceleration measurement data of the second accelerometer at each of a plurality of sixth measurement times.

It should be noted that for the acquisition methods of the fifth sequence and the sixth sequence, please refer to the introduction of the acquisition methods of the first sequence to the fourth sequence in the above text, and details will not be elaborated herein.

Correspondingly, the performing time synchronization on the first sequence, the second sequence, the third sequence, and the fourth sequence includes:

- performing time synchronization on the first sequence, the second sequence, the third sequence, the fourth sequence, the fifth sequence, and the sixth sequence.

It should be noted that for the method for performing time synchronization on the first sequence to the sixth sequence, please refer to the introduction of the method for performing time synchronization on the first sequence to the fourth sequence in the above text, and details will not be elaborated herein.

In this way, through performing time synchronization on the first sequence to the sixth sequence, it is possible to further ensure that various data used when updating predicted state variables are temporally aligned, thereby further ensuring accuracy and reliability of the correction results, and further improving estimation accuracy of the relative orientation.

In an optional embodiment of the present disclosure, the process of correcting the relative orientation between the head-mounted display device and the target device may include the following steps:

Step 1: collecting data respectively by a first magnetometer, a first accelerometer and a first gyroscope mounted on a head-mounted display device, and collecting data respectively by a second magnetometer, a second accelerometer and a second gyroscope mounted on a target device.

In an optional embodiment of the present disclosure, data collected by a magnetometer can also be referred to as a magnetometer measurement value, and the magnetometer measurement value can be represented as mag. Data collected by an accelerometer can also be referred to as an acceleration measurement value, and the acceleration measurement value can be represented as acc. Data collected by a gyroscope can also be referred to as an angular velocity measurement value, and the angular velocity measurement value can be represented as gyro.

Step 2: performing time synchronization on the data collected by the first magnetometer, the first accelerometer, the first gyroscope, the second magnetometer, the second accelerometer, and the second gyroscope respectively.

In an optional embodiment of the present disclosure, based on integration of angular velocity measurement values collected by the first gyroscope, the first predicted orientation ${}^{G}R_{I1}$ at the current correction time can be obtained. Based on integration of angular velocity measurement values collected by the second gyroscope, the second predicted orientation ${}^{G}R_{I2}$ at the current correction time can be obtained. Additionally, the first predicted bias parameter $b_{m1}$ at the current correction time and the second predicted bias parameter $b_{m2}$ at the current correction time can be determined from the two corrected bias parameters in the corrected state variables at the previous correction time. In this way, the predicted state variables at the current correction time can be obtained, and the predicted state variables at the current correction time include $b_{m1}$, $b_{m2}$, ${}^{G}R_{I1}$, and ${}^{G}R_{I2}$.

By using at least one constraint condition selected from the magnetic constraint condition, the first state constraint condition, and the second state constraint condition described above, and through the Kalman filter algorithm, the predicted state variables at the current correction time can be corrected. Therefore, the first corrected bias parameter $b_{m1}'$ at the current correction time, the second corrected bias parameter $b_{m2}'$ at the current correction time, the first corrected orientation ${}^{G}R_{I1}'$ at the current correction time, and the second corrected orientation ${}^{G}R_{I2}'$ at the current correction time can be obtained. According to ${}^{G}R_{I2}'$ and ${}^{G}R_{I1}'$, the relative orientation ${}^{I2}R_{I1}$ between the head-mounted display device and the target device can be calculated, and ${}^{I2}R_{I1}$ can be regarded as the relative orientation after correction.

It should be noted that $b_{m1}$, $b_{m2}$, ${}^{G}R_{I1}$, and ${}^{G}R_{I2}$ may be initialized before performing an integration operation on the angular velocity measurement values collected by the gyroscope.

In an optional embodiment of the present disclosure, the first magnetometer and the second magnetometer can be calibrated in advance. For example, the first magnetometer and the second magnetometer can be calibrated by a magnetometer calibration algorithm such as a figure-eight motion method. At this time, $b_{m1}$ and $b_{m2}$ obtained from calibration can be used as the initialized $b_{m1}$ and $b_{m2}$. If the first magnetometer and the second magnetometer are not calibrated in advance, $b_{m1}$ and $b_{m2}$ can also be initialized to 0.

In an optional embodiment of the present disclosure, ${}^{G}R_{I1}$ and ${}^{G}R_{I2}$ can be initialized through at least one constraint condition selected from the magnetic constraint condition, the first state constraint condition, and the second state constraint condition. Alternatively, both ${}^{G}R_{I1}$ and ${}^{G}R_{I2}$ can be initialized as unit rotation matrices.

In an optional embodiment of the present disclosure, an initial value of the covariance can be a preset value.

It should be noted that during a Kalman filtering process, the value of w1 corresponding to $b_{m1}$ and the value of w2 corresponding to $b_{m2}$ are initially small. This is because in an initial stage of filtering, more trust is placed in the magnetic constraint conditions. However, as time goes by, $b_{m1}$ and $b_{m2}$ gradually converge to their true values, and the value of w1 corresponding to $b_{m1}$ and the value of w2 corresponding to $b_{m2}$ will increase.

The situations introduced in the above method embodiments are all about correcting the relative orientation between the head-mounted display device and the target device. However, the applicable scope of the embodiments of the present disclosure is not limited to this situation. Any implementation that makes use of the concept in the embodiments of the present disclosure can correct the relative orientation between any two devices according to actual needs, as long as the two devices are respectively provided with the sensors described above.

In summary, in the embodiments of the present disclosure, regardless of whether the target magnetic field environment changes over time, by applying a constraint method, when the predicted state variables and the predicted covariance are corrected, the accuracy and reliability of the correction results can be effectively improved, the relative orientation error can be reduced, and the estimation accuracy of the relative orientation can be enhanced.

Any method for displaying images on a head-mounted display device provided in embodiments of the present disclosure may be executed by any suitable device having data processing capabilities, including, but not limited to a terminal device and a server, etc. Alternatively, any method for displaying images on a head-mounted display device provided in embodiments of the present disclosure may be executed by a processor. For example, the processor executes any method for displaying images on a head-mounted display device mentioned in embodiments of the present disclosure, by calling corresponding instructions stored in a memory. This will not be described herein.

Exemplary Apparatus

An exemplary embodiment of the present disclosure provides an apparatus for displaying images on a head-mounted display device.

Figure 7:
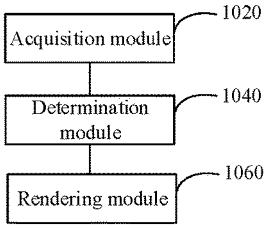
FIG. 7 is a structural schematic diagram of an apparatus for displaying images on a head-mounted display device provided in an exemplary embodiment of the present disclosure.

As shown in FIG. 7, the apparatus can include:

an acquisition module 1020 configured to acquire predicted state variables and observation data at a current correction time, wherein the predicted state variables include: a first predicted orientation of a head-mounted display device in a world coordinate system, a second predicted orientation of a target device in the world coordinate system, a first predicted bias parameter of a first magnetometer mounted on the head-mounted display device, and a second predicted bias parameter of a second magnetometer mounted on the target device; the target device is a device associated with image display of the head-mounted display device; and the observation data includes at least one of the following: data collected by the first magnetometer and the second magnetometer, and data collected by at least one of the first accelerometer mounted on the head-mounted display device and the second accelerometer mounted on the target device;

a determination module 1040 configured to determine corrected state variables at the current correction time based on the predicted state variables and the observation data at the current correction time, wherein the corrected state variables include: a first corrected orientation of the head-mounted display device in the world coordinate system, a second corrected orientation of the target device in the world coordinate system, a first corrected bias parameter of the first magnetometer, and a second corrected bias parameter of the second magnetometer; the first predicted bias parameter at the current correction time is equal to the corrected bias parameter of the first magnetometer at a previous correction time; the second predicted bias parameter at the current correction time is equal to the corrected bias parameter of the second magnetometer at the previous correction time; the first predicted orientation at the current correction time is obtained by adding a first angular variation of the head-mounted display device at the current correction time to the corrected orientation of the head-mounted display device at the previous correction time; the second predicted orientation at the current correction time is obtained by adding a second angular variation of the target device at the current correction time to a corrected orientation of the target device at the previous correction time; the first angular variation of the head-mounted display device at the current correction time includes: an integral value of angular velocity data collected by a first gyroscope mounted on the head-mounted display device from the previous correction time to the current correction time; and the second angular variation of the target device at the current correction time includes: an integral value of angular velocity data collected by a second gyroscope mounted on the target device from the previous correction time to the current correction time; and the determination module 1040 is further configured to determine a relative orientation between the head-mounted display device and the target device based on the first corrected orientation and the second corrected orientation; and a rendering module 1060 configured to render to-be-displayed images of the head-mounted display device based on the relative orientation, so as to display the to-be-displayed images through the head-mounted display device.

In an optional embodiment of the present disclosure, the determination module 1040 is configured to superimpose a corrected covariance corresponding to the corrected state variables at the previous correction time and a noise covariance converted from a preset angular velocity data integration noise, to obtain a predicted covariance corresponding to the predicted state variables at the current correction time, and the determination module 1040 is further configured to determine the corrected state variables at the current correction time and the corrected covariance corresponding to the corrected state variables based on the predicted state variables at the current correction time, the predicted covariance corresponding to the predicted state variables, and the observation data.

In an optional embodiment of the present disclosure, the determination module 1040 is configured to determine a first weight corresponding to the first corrected bias parameter, a second weight corresponding to the second corrected bias parameter, a third weight corresponding to the first corrected orientation, and a fourth weight corresponding to the second corrected orientation based on the predicted covariance corresponding to the predicted state variables at the current correction time, and correct the predicted state variables at the current correction time and the predicted covariance corresponding to the predicted state variables based on the first weight, the second weight, the third weight, the fourth weight, and the observation data, to obtain the corrected state variables at the current correction time and the corrected covariance corresponding to the corrected state variables.

In an optional embodiment of the present disclosure, the observation data at the current correction time includes: first magnetic force measurement data of the first magnetometer at the current correction time and second magnetic force measurement data of the second magnetometer at the current correction time.

The determination module 1040 is configured to determine a fifth weight corresponding to an error of a magnetic constraint condition at the current correction time based on the first predicted orientation, a first noise corresponding to the first magnetic force measurement data, the second predicted orientation, and a second noise corresponding to the second magnetic force measurement data, wherein the magnetic constraint conditions at the current correction time are defined by the first corrected orientation, the second corrected orientation, the first magnetic force measurement data, the second magnetic force measurement data, the first corrected bias parameter, and the second corrected bias parameter at the current correction time, and the determination module 1040 is further configured to correct the predicted state variables at the current correction time and the predicted covariance corresponding to the predicted state variable based on the first weight, the second weight, the third weight, the fourth weight, the first magnetic force measurement data, the second magnetic force measurement data, and the fifth weight, to obtain the corrected state variables at the current correction time and the corrected covariance corresponding to the corrected state variables.

In an optional embodiment of the present disclosure, the determination module 1040 is configured to correct the predicted state variables at the current correction time with an object of minimizing a target error.

In an optional embodiment of the present disclosure, the target error is the sum of a first error and a second error, the first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, and the second error satisfies: $e2=w5*[{}^{G}R_{I1}'(m_1-b_{m1}')-{}^{G}R_{I2}'(m_2-b_{m2}')]^2$; where e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e2 represents the second error, w5 represents the fifth weight, $m_1$ represents the first magnetic force measurement data, and $m_2$ represents the second magnetic force measurement data.

In an optional embodiment of the present disclosure, the determination module 1040 is configured to sum a first multiplication result and a second multiplication result to obtain a summation result, wherein the first multiplication result includes a result of multiplying the first predicted orientation, the first noise, and a transposed result of the first predicted orientation, and the second multiplication result includes a result of multiplying the second predicted orientation, the second noise, and a transposed result of the second predicted orientation, and the determination module 1040 is further configured to determine the fifth weight corresponding to an error of the magnetic constraint condition based on the summation result, wherein the fifth weight is negatively correlated with the summation result.

In an optional embodiment of the present disclosure, the observation data at the current correction time includes: first acceleration measurement data of the first accelerometer at the current correction time and second acceleration measurement data of the second accelerometer at the current correction time.

For the case where the head-mounted display device is in a first preset state:

the determination module 1040 is configured to determine a sixth weight corresponding to an error of a first state constraint condition of the head-mounted display device, wherein the first preset state includes at least one of the following: a stationary state and a uniform linear motion state; the first state constraint condition is defined by the first predicted orientation, the first acceleration measurement data, and gravitational acceleration in the world coordinate system at the current correction time, and the determination module 1040 is further configured to correct the predicted state variables at the current correction time and the predicted covariance corresponding to the predicted state variables based on the first weight, the second weight, the third weight, the fourth weight, the first acceleration measurement data, the first predicted orientation, the sixth weight, and the gravitational acceleration in the world coordinate system, to obtain the corrected state variables at the current correction time and the corrected covariance corresponding to the corrected state variables.

For the case where the target device is in a second preset state:

the determination module 1040 is configured to determine a seventh weight corresponding to an error of a second state constraint condition of the target device, wherein the second preset state includes at least one of the following: a stationary state and a uniform linear motion state, and the second state constraint condition is defined by the second predicted orientation, the second acceleration measurement data, and the gravitational acceleration in the world coordinate system at the current correction time; and the determination module 1040 is further configured to correct the predicted state variables at the current correction time and the predicted covariance corresponding to the predicted state variables based on the first weight, the second weight, the third weight, the fourth weight, the second acceleration measurement data, the second predicted orientation, the seventh weight, and the gravitational acceleration in the world coordinate system, to obtain the corrected state variables at the current correction time and the corrected covariance corresponding to the corrected state variables.

In an optional embodiment of the present disclosure, when the head-mounted display device is in a first preset state, the determination module 1040 is configured to correct the predicted state variables at the current correction time with an object of minimizing a target error.

In an optional embodiment of the present disclosure, the target error is the sum of a first error and a third error, the first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, and the third error satisfies: $e3=w6*({}^{G}R_{I1}*a_{m1}+{}^{G}g)^2$; wherein e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e3 represents the third error, w6 represents the sixth weight, $a_{m1}$ represents the first acceleration measurement data, and ${}^{G}g$ represents the gravitational acceleration in the world coordinate system.

In an optional embodiment of the present disclosure, when the target device is in a second preset state, the determination module 1040 is configured to correct the predicted state variables at the current correction time with an object of minimizing a target error.

In an optional embodiment of the present disclosure, the target error is the sum of a first error and a fourth error, the first error satisfies: $e1=w1*(b_{m1}'-b_{m1})^2+w2*(b_{m2}'-b_{m2})^2+w3*({}^{G}R_{I1}'-{}^{G}R_{I1}')^2+w4*({}^{G}R_{I2}'-{}^{G}R_{I2})^2$, and the fourth error satisfies: $e4=w7*({}^{G}R_{I2}*a_{m2}+{}^{G}g)^2$; where e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e4 represents the fourth error, w7 represents the seventh weight, $a_{m2}$ represents the second acceleration measurement data, and ${}^{G}g$ represents the gravitational acceleration in the world coordinate system.

In an optional embodiment of the present disclosure, the determination module 1040 is configured to determine the first measurement value fluctuation evaluation parameter of the first acceleration measurement data, and determine the sixth weight based on the first measurement value fluctuation evaluation parameter, wherein the sixth weight is negatively correlated with the first measurement value fluctuation evaluation parameter.

In an optional embodiment of the present disclosure, the determination module 1040 is configured to determine a second measurement value fluctuation evaluation parameter of the second acceleration measurement data, and determine the seventh weight based on the second measurement value fluctuation evaluation parameter, wherein the seventh weight is negatively correlated with the second measurement value fluctuation evaluation parameter.

In an optional embodiment of the present disclosure, the observation data at the current correction time includes: first magnetic force measurement data of the first magnetometer at the current correction time, second magnetic force measurement data of the second magnetometer at the current correction time, first acceleration measurement data of the first accelerometer at the current correction time, and second acceleration measurement data of the second accelerometer at the current correction time.

The determination module 1040 is configured to: determine the fifth weight corresponding to an error of the magnetic constraint condition at the current correction time based on the first predicted orientation, the first noise corresponding to the first magnetic force measurement data, the second predicted orientation, and the second noise corresponding to the second magnetic force measurement data, wherein the magnetic constraint condition at the current correction time is defined by the first corrected orientation, the second corrected orientation, the first magnetic force measurement data, the second magnetic force measurement data, the first corrected bias parameter, and the second corrected bias parameter at the current correction time; determine the sixth weight corresponding to an error of the first state constraint condition of the head-mounted display device based on the first measurement value fluctuation evaluation parameter of the first acceleration measurement data, wherein the first state constraint condition is defined by the first predicted orientation, the first acceleration measurement data, and the gravitational acceleration in the world coordinate system at the current correction time; determine the seventh weight corresponding to an error of the second state constraint condition of the target device based on the second measurement value fluctuation evaluation parameter of the second acceleration measurement data, wherein the second state constraint condition is defined by the second predicted orientation, the second acceleration measurement data, and the gravitational acceleration in the world coordinate system at the current correction time; and correct the predicted state variables at the current correction time and the predicted covariance corresponding to the predicted state variables based on the first weight, the second weight, the third weight, the fourth weight, the first magnetic force measurement data, the second magnetic force measurement data, the fifth weight, the first acceleration measurement data, the first predicted orientation, the second acceleration measurement data, the second predicted orientation, the sixth weight, the seventh weight, and the gravitational acceleration in the world coordinate system, to obtain the corrected state variables at the current correction time and the corrected covariance corresponding to the corrected state variables.

In an optional embodiment of the present disclosure, the determination module 1040 is configured to correct the predicted state variables at the current correction time with an object of minimizing a target error.

In an optional embodiment of the present disclosure, the target error is the sum of a first error, a second error, a third error and a fourth error, the first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, the second error satisfies: $e2=w5*[{}^{G}R_{I1}'(m_1-b_{m1}')-{}^{G}R_{I2}'(m_2-b_{m2}')]^2$, the third error satisfies: $e3=w6*({}^{G}R_{I1}*a_{m1}+{}^{G}g)^2$, and the fourth error satisfies: $e4=w7*({}^{G}R_{I2}*a_{m2}+{}^{G}g)^2$; where e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e2 represents the second error, w5 represents the fifth weight, $m_1$ represents the first magnetic force measurement data, $m_2$ represents the second magnetic force measurement data, e3 represents the third error, w6 represents the sixth weight, $a_{m1}$ represents the first acceleration measurement data, ${}^{G}g$ represents the gravitational acceleration in the world coordinate system, e4 represents the fourth error, w7 represents the seventh weight, and $a_{m2}$ represents the second acceleration measurement data.

In an optional embodiment of the present disclosure, the acquisition module 1020 is further configured to: acquire a first sequence, wherein the first sequence includes angular velocity measurement data of the first gyroscope at each of a plurality of first measurement times; acquire a second sequence, wherein the second sequence includes angular velocity measurement data of the second gyroscope at each of a plurality of second measurement times; acquire a third sequence, wherein the third sequence includes the first magnetic force measurement data of the first magnetometer at each of a plurality of third measurement times; and acquire a fourth sequence, wherein the fourth sequence includes second magnetic force measurement data of the second magnetometer at each of a plurality of fourth measurement times.

Figure 8:
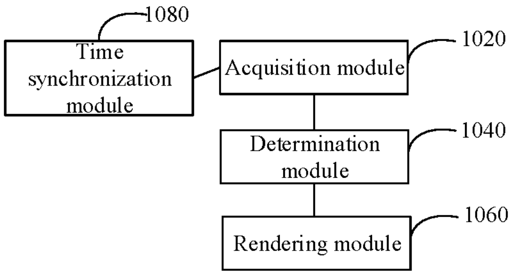
FIG. 8 is a structural schematic diagram of an apparatus for displaying images on a head-mounted display device provided in another exemplary embodiment of the present disclosure.

As shown in FIG. 8, the apparatus further includes:

a time synchronization module 1080 configured to perform time synchronization on the first sequence, the second sequence, the third sequence, and the fourth sequence.

In an optional embodiment of the present disclosure, the acquisition module 1020 is further configured to acquire a fifth sequence, wherein the fifth sequence includes first acceleration measurement data of the first accelerometer at each of a plurality of fifth measurement times; and acquire a sixth sequence, wherein the sixth sequence includes second acceleration measurement data of the second accelerometer at each of a plurality of sixth measurement times.

The time synchronization module 1080 is configured to perform time synchronization on the first sequence, the second sequence, the third sequence, the fourth sequence, the fifth sequence and the sixth sequence.

In an optional embodiment of the present disclosure, the target device includes at least one of the following: a movable platform on which a head-mounted display device is located; a control device paired with a head-mounted display device; and a portable device paired with a head-mounted display device.

In the apparatus of the present disclosure, various optional embodiments, optional implementation manners, and optional examples disclosed above can be flexibly selected and combined as needed, so as to achieve corresponding functions and effects, which will not be enumerated in the present disclosure.

Exemplary Electronic Device

The electronic device according to embodiments of the present disclosure will be described below with reference to FIG. 9. The electronic device may be either or both of a first device and a second device, or a stand-alone device independent thereof. The stand-alone device may communicate with the first device and the second device to receive collected input signals therefrom.

Figure 9:
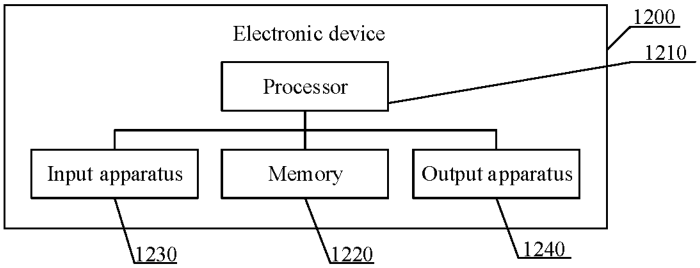
FIG. 9 is a structural diagram of an electronic device provided in an exemplary embodiment of the present disclosure.

FIG. 9 shows a block diagram of an electronic device 1200 according to embodiments of the present disclosure.

As shown in FIG. 9, the electronic device 1200 includes one or more processors 1210 and a memory 1220.

The memory 1220 is configured to store computer programs.

The processor 1210 is configured to execute the computer program stored in the memory 1220. When executed, the computer program implements the steps of the method for displaying images on a head-mounted display device according to various embodiments of the present disclosure described in the above "exemplary method" in the specification.

The processor 1210 can be a central processing unit (CPU) or other forms of processing units with data processing capabilities and/or instruction execution capabilities, and can control other components in the electronic device 1200 to perform desired functions.

The memory 1220 may include one or more computer program products, and the computer program products may include various forms of computer-readable storage media, such as a volatile memory and/or a non-volatile memory. The volatile memory may, for example, include a random-access memory (RAM) and/or a cache memory, etc. The non-volatile memory may, for example, include a read-only memory (ROM), a hard disk, a flash memory, etc. One or more computer program instructions may be stored on the computer-readable storage medium, and the processor 1210 may execute the program instructions to implement the method for displaying images on a head-mounted display device in various embodiments of the present disclosure, and/or achieve other desired functions. Various contents such as input signals, signal components and noise components may also be stored in the computer-readable storage medium.

In one example, the electronic device 1200 may further include an input apparatus 1230 and an output apparatus 1240, and these components are interconnected through a bus system and/or other forms of connection mechanisms (not shown).

For example, when the electronic device 1200 is the first device or the second device, the input apparatus 1230 may be a microphone or a microphone array. When the electronic device 1200 is a stand-alone device, the input apparatus 1230 may be a communication network connector and is configured to receive the collected input signals from the first device and the second device.

In addition, the input apparatus 1230 may also include, for example, a keyboard, a mouse and so on.

The output apparatus 1240 can output various kinds of information to the outside. The output apparatus 1240 may include, for example, a display, a loudspeaker, a printer, a communication network, and a remote output apparatus connected thereto, and so on.

Of course, for ease of simplicity, only some of the components related to the present disclosure in the electronic device 1200 are shown in FIG. 9, and components such as a bus and an input/output interface are omitted. In addition, depending on specific applications, the electronic device 1200 may also include any other appropriate components.

Exemplary Computer Program Product and Computer-Readable Storage Medium

In addition to the above methods and devices, the embodiments of the present disclosure may also take the form of a computer program product, and the computer program product includes computer program instructions. When these computer program instructions are executed by a processor, the processor is enabled to perform steps of the method for displaying images on a head-mounted display device according to various embodiments of the present disclosure described in the "exemplary method" section of this specification.

The computer program product may use any combination of one or more programming languages to write program code for performing operations of the embodiments of the present disclosure. The programming languages include an object-oriented programming language such as Java or C++, and also include a conventional procedural programming language, such as "C" language or a similar programming language. The program code may be executed entirely on a user's computing device, partly on a user's device, as an independent software package, partly on a user's computing device and partly on a remote computing device, or entirely on a remote computing device or server.

In addition, embodiments of the present disclosure may also be a computer-readable storage medium configured to store computer program instructions therein. The computer program instructions, when executed by a processor, cause the processor to execute the steps of the method for displaying images on a head-mounted display device according to various embodiments of the present disclosure as described in the above "exemplary method" section of this specification.

The computer-readable storage medium may be any combination of one or more readable media. The readable medium may be a readable signal medium or a readable storage medium. The readable storage medium may include, for example, but is not limited to, an electronic, magnetic, optical, electromagnetic, infrared, or semiconductor system, apparatus or device, or any combination thereof. More specific examples (a non-exhaustive list) of the readable storage medium include: an electrical connection with one or more conducting wires, a portable disk, a hard disk, a random-access memory (RAM), a read-only memory (ROM), an erasable programmable read-only memory (EPROM or flash memory), an optical fiber, a portable compact disk read-only memory ((CD-ROM), an optical storage device, a magnetic storage device, or any suitable combination thereof.

Basic principles of the present disclosure are described above in conjunction with specific embodiments. However, it should be noted that the advantages, strengths, effects and the like mentioned in the present disclosure are only examples and not limitations, and these advantages, strengths, effects and the like should not be regarded as indispensable for the embodiments of the present disclosure. In addition, the specific details in the above disclosure are only for the purposes of exemplification and ease of understanding, and are not limiting. The above details do not constrain the present disclosure to be necessarily implemented with the above specific details.

The embodiments in the specification are described in a progressive manner. Each embodiment focuses on differences from other embodiments. For the same and similar parts between the embodiments, reference can be made to each other. A system embodiment, which substantially corresponds to a method embodiment, is described relatively simply, and for its relevant parts, reference may be made to parts of description of the method embodiment.

Block diagrams of devices, apparatuses, equipment, and systems involved in the present disclosure are only used as illustrative examples and are not intended to require or imply that they are necessarily connected, arranged, or configured in the manner illustrated in the block diagrams. As will be recognized by those skilled in the art, these devices, apparatuses, equipment, and systems may be connected, arranged, or configured in any manner. Words such as "include", "comprise", "have", etc. are open-ended terms, mean "include but not limited to" and may be used interchangeably. The words "or" and "and" as used herein refer to the words "and/or", and may be used interchangeably therewith unless the context clearly indicates otherwise. The word "such as" as used herein refers to the phrase "such as, but not limited to", and may be used interchangeably therewith.

The method and apparatus of the present disclosure may be implemented in many ways. For example, the method and apparatus of the present disclosure may be implemented by software, hardware, firmware, or any combination of software, hardware, and firmware. The above order for the steps of the described method is only for an illustrative purpose, and the steps of the methods of the present disclosure are not limited to the order specifically described above, unless otherwise specified. Additionally, in some embodiments, the present disclosure may also be implemented as programs recorded in a recording medium. The programs include machine-readable instructions for implementing the method according to the present disclosure. Therefore, the present disclosure also covers a recording medium that stores programs for performing the method according to the present disclosure.

It should also be noted that in the apparatus, device and method of the present disclosure, the components or steps are decomposable and/or recombinable. These decompositions and/or recombinations should be considered as equivalents of the present disclosure.

The above description of the disclosed aspects is provided to enable those skilled in the art to carry out or use the present disclosure. Various modifications to these aspects are very apparent to those skilled in the art, and general principles defined herein may be applied to other aspects without departing from the scope of the present disclosure. Accordingly, the present disclosure is not intended to be limited to the aspects illustrated herein, but rather in accordance with the broadest scope consistent with the principles and novel features disclosed herein.

The above description has been made for purposes of illustration and description. In addition, this description is not intended to limit the embodiments of the present disclosure to the forms disclosed herein. Although a plurality of example aspects and embodiments have been discussed above, certain variations, modifications, changes, additions, and sub-combinations thereof would occur to those skilled in the art.

The invention claimed is:

1. A method for displaying images on a head-mounted display device, comprising:

acquiring predicted state variables and observation data at a current correction time, wherein the predicted state variables comprise: a first predicted orientation of a head-mounted display device in a world coordinate system, a second predicted orientation of a target device in the world coordinate system, a first predicted bias parameter of a first magnetometer mounted on the head-mounted display device, and a second predicted bias parameter of a second magnetometer mounted on the target device; the target device is a device associated with image display of the head-mounted display device; and the observation data comprises at least one of the following: data collected by the first magnetometer and the second magnetometer, and data collected by at least one of a first accelerometer mounted on the head-mounted display device and a second accelerometer mounted on the target device;

determining corrected state variables at the current correction time based on the predicted state variables and the observation data at the current correction time, wherein the corrected state variables include: a first corrected orientation of the head-mounted display device in the world coordinate system, a second corrected orientation of the target device in the world coordinate system, a first corrected bias parameter of the first magnetometer, and a second corrected bias parameter of the second magnetometer; the first predicted bias parameter at the current correction time is equal to a corrected bias parameter of the first magnetometer at a previous correction time; the second predicted bias parameter at the current correction time is equal to a corrected bias parameter of the second magnetometer at the previous correction time; a first predicted orientation at the current correction time is obtained by adding a first angular variation of the head-mounted display device at the current correction time to a corrected orientation of the head-mounted display device at the previous correction time; a second predicted orientation at the current correction time is obtained by adding a second angular variation of the target device at the current correction time to a corrected orientation of the target device at the previous correction time; the first angular variation of the head-mounted display device at the current correction time includes: an integral value of angular velocity data collected by a first gyroscope mounted on the head-mounted display device from the previous correction time to the current correction time; and the second angular variation of the target device at the current correction time includes: an integral value of angular velocity data collected by a second gyroscope mounted on the target device from the previous correction time to the current correction time;

determining a relative orientation between the head-mounted display device and the target device based on the first corrected orientation and the second corrected orientation; and rendering to-be-displayed images of the head-mounted display device based on the relative orientation, so as to display the to-be-displayed images through the head-mounted display device.

2. The method according to claim 1, wherein determining corrected state variables at a current correction time based on the predicted state variables and the observation data at the current correction time comprises:

superimposing a corrected covariance corresponding to corrected state variables at the previous correction time and a noise covariance converted from a preset angular velocity data integration noise, to obtain a predicted covariance corresponding to the predicted state variables at the current correction time; and determining the corrected state variables at the current correction time and the corrected covariance corresponding to the corrected state variables based on the predicted state variables at the current correction time, the predicted covariance corresponding to the predicted state variables, and the observation data.

3. The method according to claim 2, wherein determining the corrected state variables at the current correction time and the corrected covariance corresponding to the corrected state variables based on the predicted state variables at the current correction time, the predicted covariance corresponding to the predicted state variables, and the observation data comprises:

determining a first weight corresponding to the first corrected bias parameter, a second weight corresponding to the second corrected bias parameter, a third weight corresponding to the first corrected orientation, and a fourth weight corresponding to the second corrected orientation based on the predicted covariance corresponding to the predicted state variables at the current correction time; and correcting the predicted state variables at the current correction time and the predicted covariance corresponding to the predicted state variables based on the first weight, the second weight, the third weight, the fourth weight, and the observation data, to obtain the corrected state variables at the current correction time and the corrected covariance corresponding to the corrected state variables.

4. The method according to claim 3, wherein the observation data at the current correction time comprises: first magnetic force measurement data of the first magnetometer at the current correction time and second magnetic force measurement data of the second magnetometer at the current correction time;

correcting the predicted state variables at the current correction time and the predicted covariance corresponding to the predicted state variables based on the first weight, the second weight, the third weight, the fourth weight, and the observation data, to obtain the corrected state variables at the current correction time and the corrected covariance corresponding to the corrected state variables comprises:

determining a fifth weight corresponding to an error of a magnetic constraint condition at the current correction time based on the first predicted orientation, a first noise corresponding to the first magnetic force measurement data, the second predicted orientation, and a second noise corresponding to the second magnetic force measurement data, wherein the magnetic constraint condition at the current correction time is defined by the first corrected orientation, the second corrected orientation, the first magnetic force measurement data, the second magnetic force measurement data, the first corrected bias parameter, and the second corrected bias parameter at the current correction time; and correcting the predicted state variables at the current correction time and the predicted covariance corresponding to the predicted state variable based on the first weight, the second weight, the third weight, the fourth weight, the first magnetic force measurement data, the second magnetic force measurement data, and the fifth weight, to obtain the corrected state variables at the current correction time and the corrected covariance corresponding to the corrected state variables.

5. The method according to claim 4, wherein correcting the predicted state variables at the current correction time based on the first weight, the second weight, the third weight, the fourth weight, the first magnetic force measurement data, the second magnetic force measurement data, and the fifth weight comprises:

correcting the predicted state variables at the current correction time with an object of minimizing a target error;

wherein the target error is a sum of a first error and a second error, the first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, and the second error satisfies: $e2=w5*[{}^{G}R_{I1}'(m_1-b_{m1}')-{}^{G}R_{I2}'(m_2-b_{m2}')]^2$; wherein e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e2 represents the second error, w5 represents the fifth weight, $m_1$ represents the first magnetic force measurement data, and $m_2$ represents the second magnetic force measurement data.

6. The method according to claim 4, wherein determining a fifth weight corresponding to an error of a magnetic constraint condition based on the first predicted orientation, a first noise corresponding to the first magnetic force measurement data, the second predicted orientation, and a second noise corresponding to the second magnetic force measurement data comprises:

summing a first multiplication result and a second multiplication result to obtain a summation result, wherein the first multiplication result includes a result of multiplying the first predicted orientation, the first noise, and a transposed result of the first predicted orientation, and the second multiplication result includes a result of multiplying the second predicted orientation, the second noise, and a transposed result of the second predicted orientation; and determining the fifth weight corresponding to an error of the magnetic constraint condition based on the summation result, wherein the fifth weight is negatively correlated with the summation result.

7. The method according to claim 4, wherein the observation data at the current correction time comprises: first acceleration measurement data of the first accelerometer at the current correction time and second acceleration measurement data of the second accelerometer at the current correction time;

correcting the predicted state variables at the current correction time and the predicted covariance corresponding to the predicted state variable based on the first weight, the second weight, the third weight, the fourth weight and the observation data, to obtain the corrected state variables at the current correction time and the corrected covariance corresponding to the corrected state variables comprises:

for the case where the head-mounted display device is in a first preset state:

determining a sixth weight corresponding to an error of a first state constraint condition of the head-mounted display device, wherein the first preset state includes at least one of the following: a stationary state and a uniform linear motion state, and the first state constraint condition is defined by the first predicted orientation, the first acceleration measurement data, and gravitational acceleration in the world coordinate system at the current correction time; and correcting the predicted state variables at the current correction time and the predicted covariance corresponding to the predicted state variables based on the first weight, the second weight, the third weight, the fourth weight, the first acceleration measurement data, the first predicted orientation, the sixth weight, and the gravitational acceleration in the world coordinate system, to obtain the corrected state variables at the current correction time and the corrected covariance corresponding to the corrected state variables;

for the case where the target device is in a second preset state:

determining a seventh weight corresponding to an error of a second state constraint condition of the target device, wherein the second preset state includes at least one of the following: a stationary state and a uniform linear motion state, and the second state constraint condition is defined by the second predicted orientation, the second acceleration measurement data, and the gravitational acceleration in the world coordinate system at the current correction time; and correcting the predicted state variables at the current correction time and the predicted covariance corresponding to the predicted state variables based on the first weight, the second weight, the third weight, the fourth weight, the second acceleration measurement data, the second predicted orientation, the seventh weight, and the gravitational acceleration in the world coordinate system, to obtain the corrected state variables at the current correction time and the corrected covariance corresponding to the corrected state variables.

8. The method according to claim 7, wherein when the head-mounted display device is in the first preset state, correcting the predicted state variables at the current correction time based on the first weight, the second weight, the third weight, the fourth weight, the first acceleration measurement data, the first predicted orientation, the sixth weight, and the gravitational acceleration in the world coordinate system comprises:

correcting the predicted state variables at the current correction time with an object of minimizing a target error;

wherein the target error is a sum of a first error and a third error, the first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, and the third error satisfies: $e3=w6*({}^{G}R_{I1}*a_{m1}+{}^{G}g)^2$; where e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e3 represents the third error, w6 represents the sixth weight, $a_{m1}$ represents the first acceleration measurement data, and ${}^{G}g$ represents the gravitational acceleration in the world coordinate system;

when the target device is in the second preset state, correcting the predicted state variables at the current correction time based on the first weight, the second weight, the third weight, the fourth weight, the second acceleration measurement data, the second predicted orientation, the seventh weight, and the gravitational acceleration in the world coordinate system comprises:

correcting the predicted state variables at the current correction time with an object of minimizing a target error;

wherein the target error is a sum of a first error and a fourth error, the first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, and the fourth error satisfies: $e4=w7*({}^{G}R_{I2}*a_{m2}+{}^{G}g)^2$; wherein e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e4 represents the fourth error, w7 represents the seventh weight, $a_{m2}$ represents the second acceleration measurement data, and ${}^{G}g$ represents the gravitational acceleration in the world coordinate system.

9. The method according to claim 7, wherein determining a sixth weight corresponding to an error of a first state constraint condition of the head-mounted display device comprises:

determining a first measurement value fluctuation evaluation parameter of the first acceleration measurement data; and determining the sixth weight based on the first measurement value fluctuation evaluation parameter, wherein the sixth weight is negatively correlated with the first measurement value fluctuation evaluation parameter;

determining a seventh weight corresponding to an error of a second state constraint condition of the target device comprises:

determining a second measurement value fluctuation evaluation parameter of the second acceleration measurement data; and determining the seventh weight based on the second measurement value fluctuation evaluation parameter, wherein the seventh weight is negatively correlated with the second measurement value fluctuation evaluation parameter.

10. The method according to claim 9, wherein the observation data at the current correction time comprises: first magnetic force measurement data of the first magnetometer at the current correction time, second magnetic force measurement data of the second magnetometer at the current correction time, first acceleration measurement data of the first accelerometer at the current correction time, and second acceleration measurement data of the second accelerometer at the current correction time;

correcting the predicted state variables at the current correction time and the predicted covariance corresponding to the predicted state variables based on the first weight, the second weight, the third weight, the fourth weight, and the observation data, to obtain the corrected state variables at the current correction time and the corrected covariance corresponding to the corrected state variables comprises:

determining a fifth weight corresponding to an error of the magnetic constraint condition at the current correction time based on the first predicted orientation, the first noise corresponding to the first magnetic force measurement data, the second predicted orientation, and the second noise corresponding to the second magnetic force measurement data, wherein the magnetic constraint condition at the current correction time is defined by the first corrected orientation, the second corrected orientation, the first magnetic force measurement data, the second magnetic force measurement data, the first corrected bias parameter, and the second corrected bias parameter at the current correction time;

determining a sixth weight corresponding to an error of the first state constraint condition of the head-mounted display device based on the first measurement value fluctuation evaluation parameter of the first acceleration measurement data, wherein the first state constraint condition is defined by the first predicted orientation, the first acceleration measurement data, and the gravitational acceleration in the world coordinate system at the current correction time;

determining a seventh weight corresponding to an error of the second state constraint condition of the target device based on the second measurement value fluctuation evaluation parameter of the second acceleration measurement data, wherein the second state constraint condition is defined by the second predicted orientation, the second acceleration measurement data, and the gravitational acceleration in the world coordinate system at the current correction time; and correcting the predicted state variables at the current correction time and the predicted covariance corresponding to the predicted state variables based on the first weight, the second weight, the third weight, the fourth weight, the first magnetic force measurement data, the second magnetic force measurement data, the fifth weight, the first acceleration measurement data, the first predicted orientation, the second acceleration measurement data, the second predicted orientation, the sixth weight, the seventh weight, and the gravitational acceleration in the world coordinate system, to obtain the corrected state variables at the current correction time and the corrected covariance corresponding to the corrected state variables.

11. The method according to claim 10, wherein correcting the predicted state variables at the current correction time based on the first weight, the second weight, the third weight, the fourth weight, the first magnetic force measurement data, the second magnetic force measurement data, the fifth weight, the first acceleration measurement data, the first predicted orientation, the second acceleration measurement data, the second predicted orientation, the sixth weight, the seventh weight, and the gravitational acceleration in the world coordinate system comprises:

correcting the predicted state variables at the current correction time with an object of minimizing a target error;

wherein the target error is a sum of a first error, a second error, a third error and a fourth error, the first error satisfies: $e1=w1*(b_{m1}'-b_{m1})^2+w2*(b_{m2}'-b_{m2})^2+w3*({}^{G}R_{I1}'-{}^{G}R_{I1})^2+w4*({}^{G}R_{I2}'-{}^{G}R_{I2})^2$, the second error satisfies: $e2=w5*[{}^{G}R_{I1}'(m_1-b_{m1}')-{}^{G}R_{I2}'(m_2-b_{m2}')]^2$, the third error satisfies: $e3=w6*({}^{G}R_{I1}*a_{m1}+{}^{G}g)^2$, and the fourth error satisfies: $e4=w7*({}^{G}R_{I2}*a_{m2}+{}^{G}g)^2$; where e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^{G}R_{I1}'$ represents the first corrected orientation, ${}^{G}R_{I1}$ represents the first predicted orientation, w4 represents the fourth weight, ${}^{G}R_{I2}'$ represents the second corrected orientation, ${}^{G}R_{I2}$ represents the second predicted orientation, e2 represents the second error, w5 represents the fifth weight, $m_1$ represents the first magnetic force measurement data, $m_2$ represents the second magnetic force measurement data, e3 represents the third error, w6 represents the sixth weight, $a_{m1}$ represents the first acceleration measurement data, ${}^{G}g$ represents the gravitational acceleration in the world coordinate system, e4 represents the fourth error, w7 represents the seventh weight, and $a_{m2}$ represents the second acceleration measurement data.

12. The method according to claim 10, further comprising:

acquiring a first sequence, wherein the first sequence includes angular velocity measurement data of the first gyroscope at each of a plurality of first measurement times;

acquiring a second sequence, wherein the second sequence includes angular velocity measurement data of the second gyroscope at each of a plurality of second measurement times;

acquiring a third sequence, wherein the third sequence includes the first magnetic force measurement data of the first magnetometer at each of a plurality of third measurement times;

acquiring a fourth sequence, wherein the fourth sequence includes second magnetic force measurement data of the second magnetometer at each of a plurality of fourth measurement times;

performing time synchronization on the first sequence, the second sequence, the third sequence, and the fourth sequence.

13. The method according to claim 1, wherein the target device comprises at least one of the following:

a movable platform on which the head-mounted display device is located;

a control device paired with the head-mounted display device; and a portable device paired with the head-mounted display device.

14. A non-volatile computer-readable storage medium having computer program instructions stored therein, wherein when executed by a processor, the computer program instructions implement a method for displaying images on a head-mounted display device, the method comprising:

acquiring predicted state variables and observation data at a current correction time, wherein the predicted state variables comprise: a first predicted orientation of a head-mounted display device in a world coordinate system, a second predicted orientation of a target device in the world coordinate system, a first predicted bias parameter of a first magnetometer mounted on the head-mounted display device, and a second predicted bias parameter of a second magnetometer mounted on the target device; the target device is a device associated with image display of the head-mounted display device; and the observation data comprises at least one of the following: data collected by the first magnetometer and the second magnetometer, and data collected by at least one of a first accelerometer mounted on the head-mounted display device and a second accelerometer mounted on the target device;

determining corrected state variables at the current correction time based on the predicted state variables and the observation data at the current correction time, wherein the corrected state variables include: a first corrected orientation of the head-mounted display device in the world coordinate system, a second corrected orientation of the target device in the world coordinate system, a first corrected bias parameter of the first magnetometer, and a second corrected bias parameter of the second magnetometer; the first predicted bias parameter at the current correction time is equal to a corrected bias parameter of the first magnetometer at a previous correction time; the second predicted bias parameter at the current correction time is equal to a corrected bias parameter of the second magnetometer at the previous correction time; a first predicted orientation at the current correction time is obtained by adding a first angular variation of the head-mounted display device at the current correction time to a corrected orientation of the head-mounted display device at the previous correction time; a second predicted orientation at the current correction time is obtained by adding a second angular variation of the target device at the current correction time to a corrected orientation of the target device at the previous correction time; the first angular variation of the head-mounted display device at the current correction time includes: an integral value of angular velocity data collected by a first gyroscope mounted on the head-mounted display device from the previous correction time to the current correction time; and the second angular variation of the target device at the current correction time includes: an integral value of angular velocity data collected by a second gyroscope mounted on the target device from the previous correction time to the current correction time;

determining a relative orientation between the head-mounted display device and the target device based on the first corrected orientation and the second corrected orientation; and rendering to-be-displayed images of the head-mounted display device based on the relative orientation, so as to display the to-be-displayed images through the head-mounted display device.

15. The non-volatile computer-readable storage medium according to claim 14, wherein determining corrected state variables at a current correction time based on the predicted state variables and the observation data at the current correction time comprises:

superimposing a corrected covariance corresponding to corrected state variables at the previous correction time and a noise covariance converted from a preset angular velocity data integration noise, to obtain a predicted covariance corresponding to the predicted state variables at the current correction time; and determining the corrected state variables at the current correction time and the corrected covariance corresponding to the corrected state variables based on the predicted state variables at the current correction time, the predicted covariance corresponding to the predicted state variables, and the observation data.

16. The non-volatile computer-readable storage medium according to claim 15, wherein determining the corrected state variables at the current correction time and the corrected covariance corresponding to the corrected state variables based on the predicted state variables at the current correction time, the predicted covariance corresponding to the predicted state variables, and the observation data comprises:

determining a first weight corresponding to the first corrected bias parameter, a second weight corresponding to the second corrected bias parameter, a third weight corresponding to the first corrected orientation, and a fourth weight corresponding to the second corrected orientation based on the predicted covariance corresponding to the predicted state variables at the current correction time; and correcting the predicted state variables at the current correction time and the predicted covariance corresponding to the predicted state variables based on the first weight, the second weight, the third weight, the fourth weight, and the observation data, to obtain the corrected state variables at the current correction time and the corrected covariance corresponding to the corrected state variables.

17. The non-volatile computer-readable storage medium according to claim 16, wherein the observation data at the current correction time comprises: first magnetic force measurement data of the first magnetometer at the current correction time and second magnetic force measurement data of the second magnetometer at the current correction time;

correcting the predicted state variables at the current correction time and the predicted covariance corresponding to the predicted state variables based on the first weight, the second weight, the third weight, the fourth weight, and the observation data, to obtain the corrected state variables at the current correction time and the corrected covariance corresponding to the corrected state variables comprises:

determining a fifth weight corresponding to an error of a magnetic constraint condition at the current correction time based on the first predicted orientation, a first noise corresponding to the first magnetic force measurement data, the second predicted orientation, and a second noise corresponding to the second magnetic force measurement data, wherein the magnetic constraint condition at the current correction time is defined by the first corrected orientation, the second corrected orientation, the first magnetic force measurement data, the second magnetic force measurement data, the first corrected bias parameter, and the second corrected bias parameter at the current correction time; and correcting the predicted state variables at the current correction time and the predicted covariance corresponding to the predicted state variable based on the first weight, the second weight, the third weight, the fourth weight, the first magnetic force measurement data, the second magnetic force measurement data, and the fifth weight, to obtain the corrected state variables at the current correction time and the corrected covariance corresponding to the corrected state variables.

18. The non-volatile computer-readable storage medium according to claim 17, wherein correcting the predicted state variables at the current correction time based on the first weight, the second weight, the third weight, the fourth weight, the first magnetic force measurement data, the second magnetic force measurement data, and the fifth weight comprises:

correcting the predicted state variables at the current correction time with an object of minimizing a target error;

wherein the target error is a sum of a first error and a second error, the first error satisfies: $e1=w1*(b_{m1}'-b_{m1})^2+w2*(b_{m2}'-b_{m2})^2+w3*({}^G R_{I1}'-{}^G R_{I1})^2+w4*({}^G R_{I2}'-{}^G R_{I2})^2$, and the second error satisfies: $e2=w5*[{}^G R_{I1}'(m_1-b_{m1}')-{}^G R_{I2}'(m_2-b_{m2}')]^2$; wherein e1 represents the first error, w1 represents the first weight, $b_{m1}'$ represents the first corrected bias parameter, $b_{m1}$ represents the first predicted bias parameter, w2 represents the second weight, $b_{m2}'$ represents the second corrected bias parameter, $b_{m2}$ represents the second predicted bias parameter, w3 represents the third weight, ${}^G R_{I1}'$ represents the first corrected orientation, ${}^G R_{I1}$ represents the first predicted orientation, w4 represents the fourth weight, ${}^G R_{I2}'$ represents the second corrected orientation, ${}^G R_{I2}$ represents the second predicted orientation, e2 represents the second error, w5 represents the fifth weight, $m_1$ represents the first magnetic force measurement data, and $m_2$ represents the second magnetic force measurement data.

19. The method according to claim 12, further comprising:

acquiring a fifth sequence, wherein the fifth sequence includes first acceleration measurement data of the first accelerometer at each of a plurality of fifth measurement times; and acquiring a sixth sequence, wherein the sixth sequence includes second acceleration measurement data of the second accelerometer at each of a plurality of sixth measurement times;

performing time synchronization on the first sequence, the second sequence, the third sequence, and the fourth sequence includes:

performing time synchronization on the first sequence, the second sequence, the third sequence, the fourth sequence, the fifth sequence, and the sixth sequence.

20. A method for determining a relative orientation, comprising:

acquiring predicted state variables and observation data at a current correction time, the predicted state variables including: a relative predicted orientation of a first device and a second device in a world coordinate system, a first predicted bias parameter of a first magnetometer mounted on the first device, and a second predicted bias parameter of a second magnetometer mounted on the second device, the observation data including: at least one of the following: data collected by the first magnetometer and the second magnetometer, and data collected by at least one of a first accelerometer mounted on the first device and a second accelerometer mounted on the second device;

determining corrected state variables at the current correction time based on the predicted state variables and the observation data at the current correction time, the corrected state variables including: a relative corrected orientation of the first device and the second device in the world coordinate system, a first corrected bias parameter of the first magnetometer, and a second corrected bias parameter of the second magnetometer, the first predicted bias parameter at the current correction time being equal to a corrected bias parameter of the first magnetometer at a previous correction time, and the second predicted bias parameter at the current correction time is equal to a corrected bias parameter of the second magnetometer at the previous correction time, the relative predicted orientation at the current correction time being determined by a corrected orientation of the first device at the previous correction time, a first angular variation of the first device at the current correction time, a corrected orientation of the second device at the previous correction time, and a second angular variation of the second device at the current correction time, the first angular variation of the first device at the current correction time including an integral value of an angular velocity data collected by a first gyroscope arranged on the first device from the previous correction time to the current correction time, the second angular variation of the second device at the current correction time includes an integral value of an angular velocity data collected by a second gyroscope arranged on the second device from the previous correction time to the current correction time;

determining a relative orientation between the first device and the second device based on the first corrected orientation and the second corrected orientation.

* * * * *